US008607016B2

(12) United States Patent
Conley et al.

(10) Patent No.: US 8,607,016 B2
(45) Date of Patent: Dec. 10, 2013

(54) FAT ANALYSIS FOR OPTIMIZED SEQUENTIAL CLUSTER MANAGEMENT

(75) Inventors: Kevin M. Conley, San Jose, CA (US); Alan Welsh Sinclair, Falkirk (GB); Peter John Smith, Midlothian (GB)

(73) Assignee: SanDisk Technologies Inc., Plano, TX (US)

( * ) Notice: Subject to any disclaimer, the term of this patent is extended or adjusted under 35 U.S.C. 154(b) by 340 days.

(21) Appl. No.: 11/022,369

(22) Filed: Dec. 23, 2004

(65) Prior Publication Data

US 2006/0020745 A1     Jan. 26, 2006

Related U.S. Application Data

(63) Continuation-in-part of application No. 10/897,049, filed on Jul. 21, 2004.

(51) Int. Cl.
G06F 12/00 (2006.01)
G06F 13/00 (2006.01)
G06F 13/28 (2006.01)
G06F 17/30 (2006.01)

(52) U.S. Cl.
USPC .......................................... 711/170; 707/824

(58) Field of Classification Search
USPC ................. 711/103, 170–173; 707/822–824
See application file for complete search history.

(56) References Cited

U.S. PATENT DOCUMENTS

| 5,043,940 A | 8/1991 | Harari |
| 5,172,338 A | 12/1992 | Mehrotra et al. |
| 5,337,275 A | 8/1994 | Garner |
| 5,357,475 A | 10/1994 | Hasbun |
| 5,682,497 A | 10/1997 | Robinson |
| 5,734,816 A | 3/1998 | Niijima et al. ........... 395/182.06 |
| 5,798,968 A | 8/1998 | Lee et al. |
| 5,890,192 A | 3/1999 | Lee et al. |
| 5,930,167 A | 7/1999 | Lee et al. |
| 6,014,724 A | 1/2000 | Jenett ............................. 711/103 |
| 6,125,435 A | 9/2000 | Estakhri et al. |
| 6,189,081 B1 | 2/2001 | Fujio |

(Continued)

FOREIGN PATENT DOCUMENTS

| JP | 09-319645 | 12/1997 |
| WO | WO 00/49488 | 8/2000 |
| WO | WO 02/058074 | 7/2002 |
| WO | WO2006/019496 | 2/2006 |

OTHER PUBLICATIONS

IEEE, The Authoritative Dictionary of IEEE Standards Terms, 2000, IEEE, 7th ed. 3 pages.*

(Continued)

*Primary Examiner* — Christian P Chace
*Assistant Examiner* — Gary W Cygiel
(74) *Attorney, Agent, or Firm* — Weaver Austin Villeneuve & Sampson LLP

(57) ABSTRACT

Techniques for managing data in a non-volatile memory system (e.g., Flash Memory) are disclosed. A controller can use information relating to a host's file system, which is stored by the host on non-volatile memory, to determine if one or more clusters (or sectors with clusters) are currently allocated. The controller can use the information relating to the host's file system to identify when the host is sending data to the next free cluster and to store such data in a sequential format by copying data from other locations in the non-volatile memory.

19 Claims, 12 Drawing Sheets

(56) References Cited

U.S. PATENT DOCUMENTS

| | | | |
|---|---|---|---|
| 6,385,690 B1* | 5/2002 | Iida et al. | 711/103 |
| 6,456,528 B1 | 9/2002 | Chen | |
| 6,522,580 B2 | 2/2003 | Chen et al. | |
| 6,567,307 B1 | 5/2003 | Estakhri | |
| 6,581,132 B1 | 6/2003 | Kakinuma et al. | 711/103 |
| 6,697,928 B2* | 2/2004 | March et al. | 711/171 |
| 6,725,321 B1 | 4/2004 | Sinclair et al. | 711/103 |
| 6,725,322 B1* | 4/2004 | Shiraishi et al. | 711/103 |
| 6,763,424 B2 | 7/2004 | Conley | |
| 6,823,422 B2* | 11/2004 | Maeda et al. | 711/103 |
| 7,395,384 B2 | 7/2008 | Sinclair et al. | |
| 2003/0109093 A1 | 6/2003 | Harari et al. | |
| 2003/0210587 A1 | 11/2003 | Yamagami et al. | 365/200 |
| 2005/0015557 A1* | 1/2005 | Wang et al. | 711/154 |
| 2005/0044331 A1 | 2/2005 | Simms | 711/159 |
| 2005/0132127 A1 | 6/2005 | Chung et al. | 711/103 |
| 2005/0144358 A1 | 6/2005 | Conley et al. | 711/103 |
| 2005/0144360 A1 | 6/2005 | Bennett et al. | 711/103 |
| 2005/0144361 A1* | 6/2005 | Gonzalez et al. | 711/103 |
| 2006/0020744 A1* | 1/2006 | Sinclair et al. | 711/103 |

OTHER PUBLICATIONS

Notification of Transmittal of the Int'l Search Report and the Written Opinion of the Int'l Searching Authority, or the Declaration, Int'l Appl. No. PCT/US2005/021846, Int'l Filing Date Jun. 17, 2005, mailed Oct. 13, 2005, 14 pages.
USPTO, "Advisory Action" mailed in parent U.S. Appl. No. 10/897,049 on May 23, 2007, 5 pages.
USPTO, "Final Office Action" mailed in parent U.S. Appl. No. 10/897,049 on Mar. 21, 2007, 10 pages.
USPTO, "Office Action" mailed in parent U.S. Appl. No. 10/897,049 on Oct. 13, 2006, 15 pages.
USPTO, "Office Action", mailed in parent U.S. Appl. No. 10/897,049 on Jul. 6, 2007, 14 pages.
European Patent Office, "Examiner's First Full Report", mailed in corresponding European Patent Apprcation No. 05 766 081.3 on May 30, 2007, 7 pages.
USPTO, "Final office Action", mailed in parent U.S. Appl. No. 10/897,049 on Dec. 11, 2007, 10 pages.
USPTO, "Notice of Allowance and Fee(s) Due", mailed in parent U.S. Appl. No. 10/897,049 on Feb. 25, 2008, 23 pages.
Chinese Office Action mailed Aug. 8, 2008 in Application No. 200580030163.3.
Chinese Office Action mailed Jan. 9, 2009 in Application No. 200580030163.3.
CIPO Office Action mailed Jan. 9, 2009 in Application No. 200580030163.3.
Third Office Action mailed Apr. 17, 2009 in Chinese Application No. 200580030163.3.
Examination Report dated Feb. 18, 2010 in European Application No. 05766081.3.
First Office Action mailed May 10, 2011 in Japanese Application No. 2007-522509.
Extended Search Report mailed Nov. 9, 2010 in European Application No. 10009240.2.
Office Action mailed Jul. 18, 2011 in European Application No. 10009240.2.
PCT International Preliminary Report on Patentability and Written Opinion dated Jan. 23, 2007 issued in PCT/US2005/021846.
European Office Action dated Nov. 4, 2010 issued in EP Application No. 05 766 081.3.

* cited by examiner

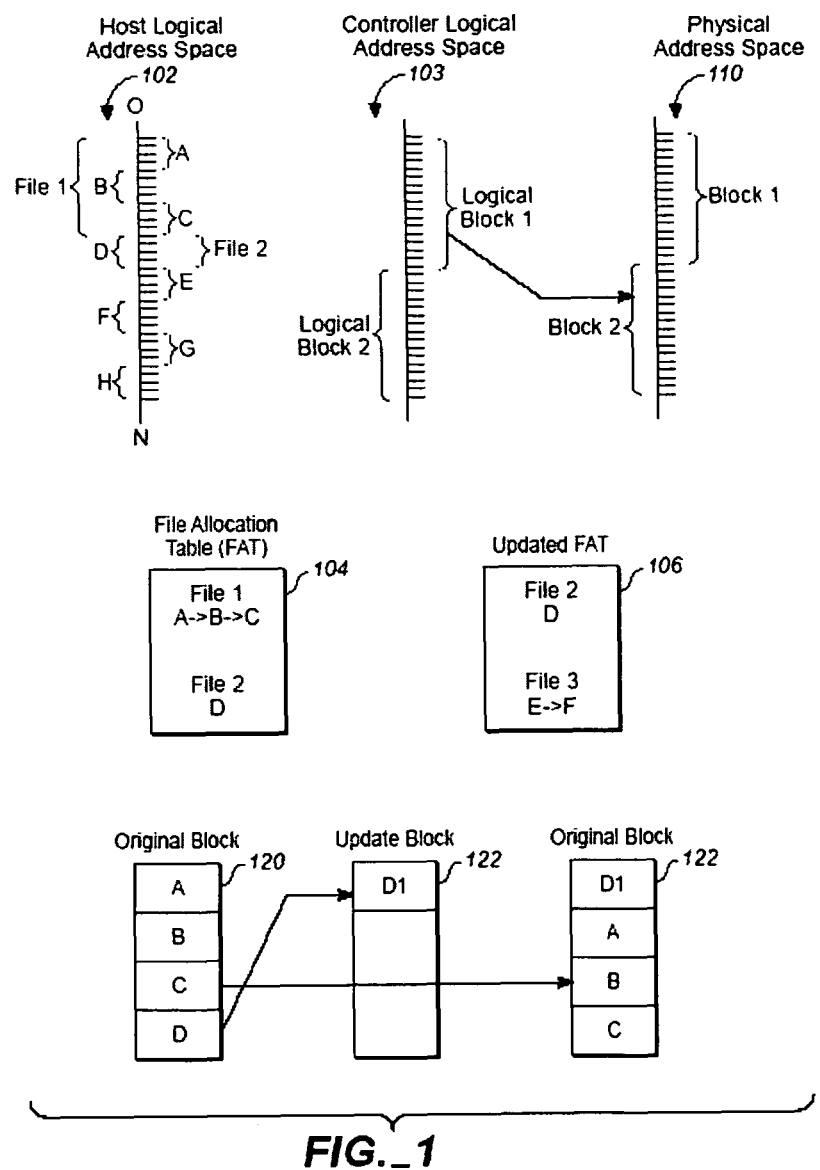
FIG._1
PRIOR ART

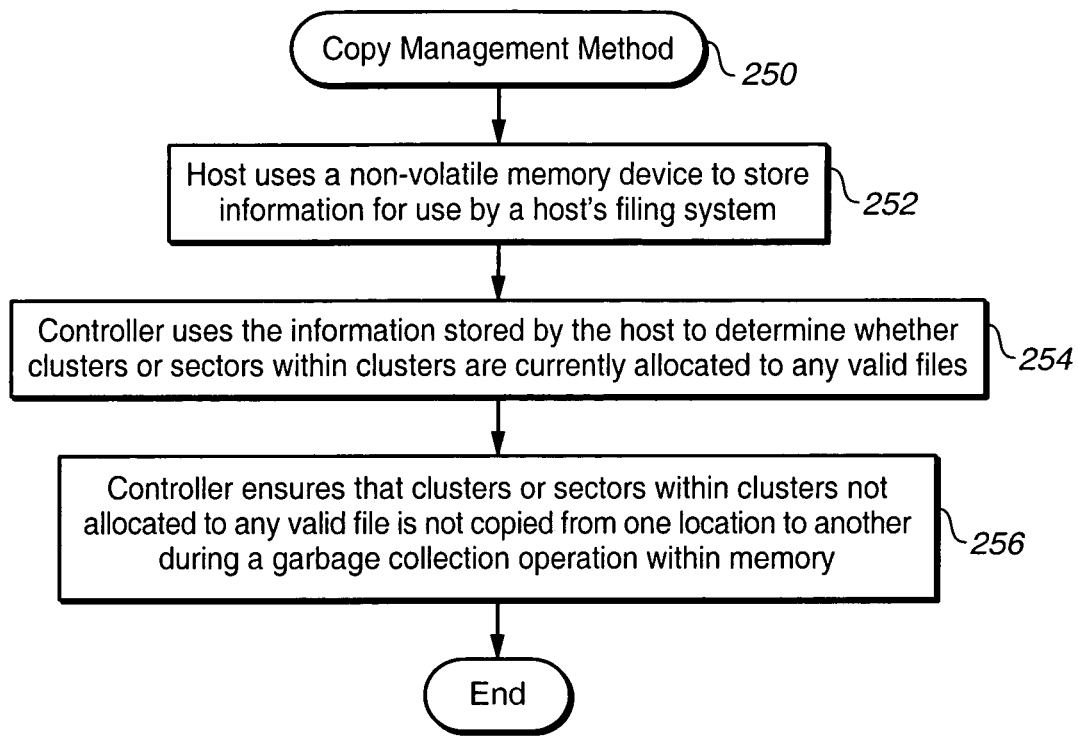
FIG._2A

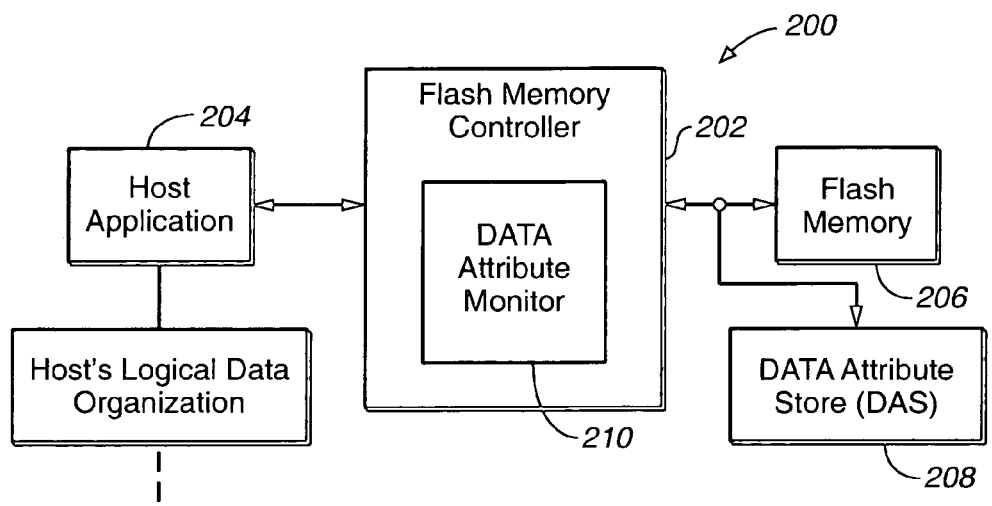
*FIG._2B*
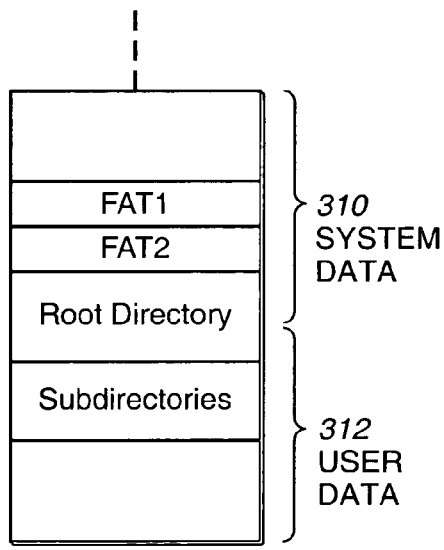
*FIG._3C*
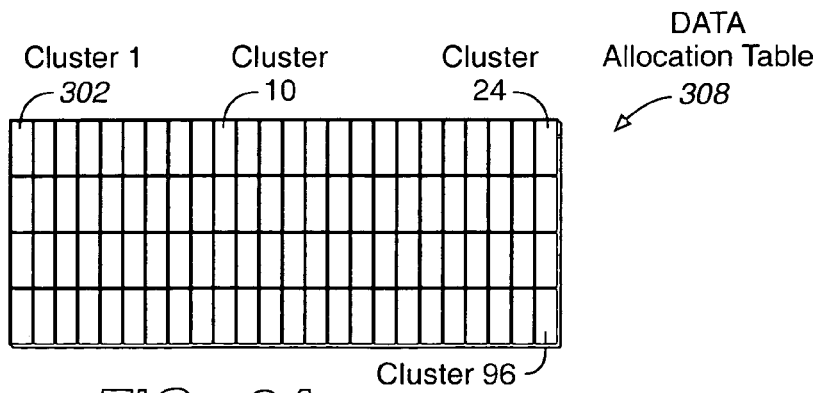
*FIG._3A*
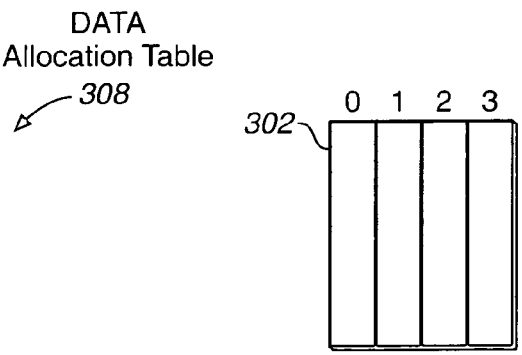
*FIG._3B*

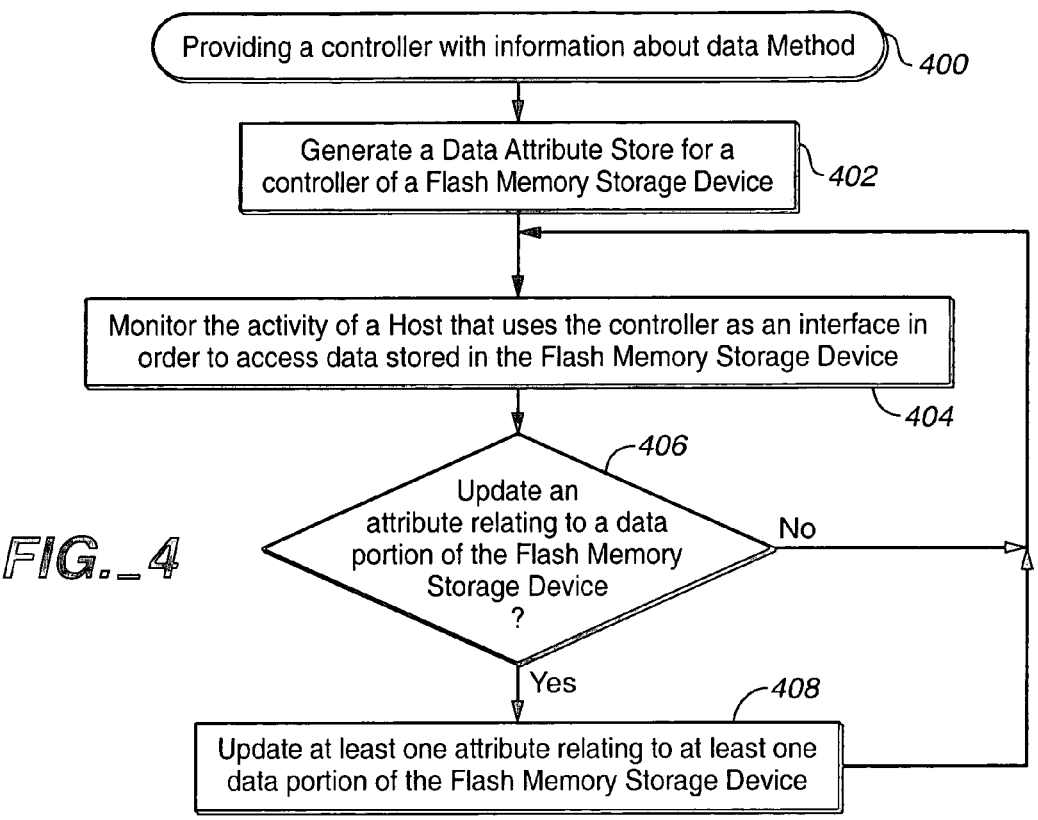
FIG._4
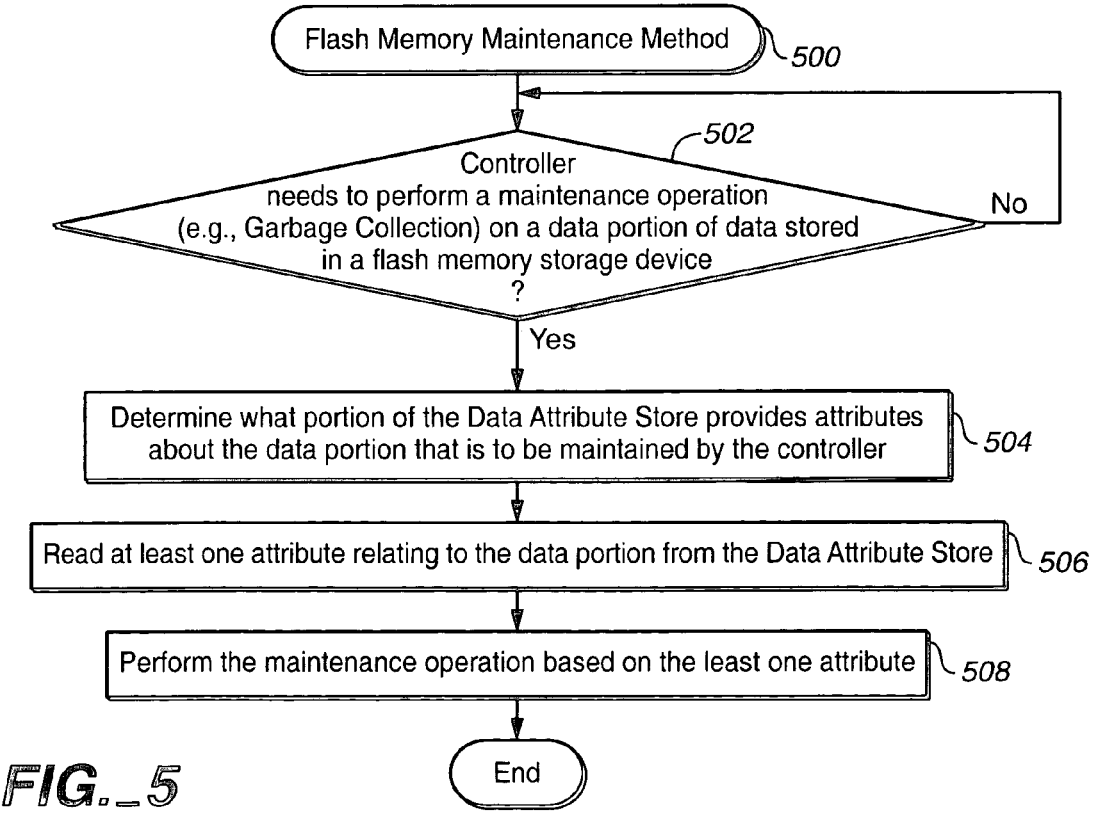
FIG._5

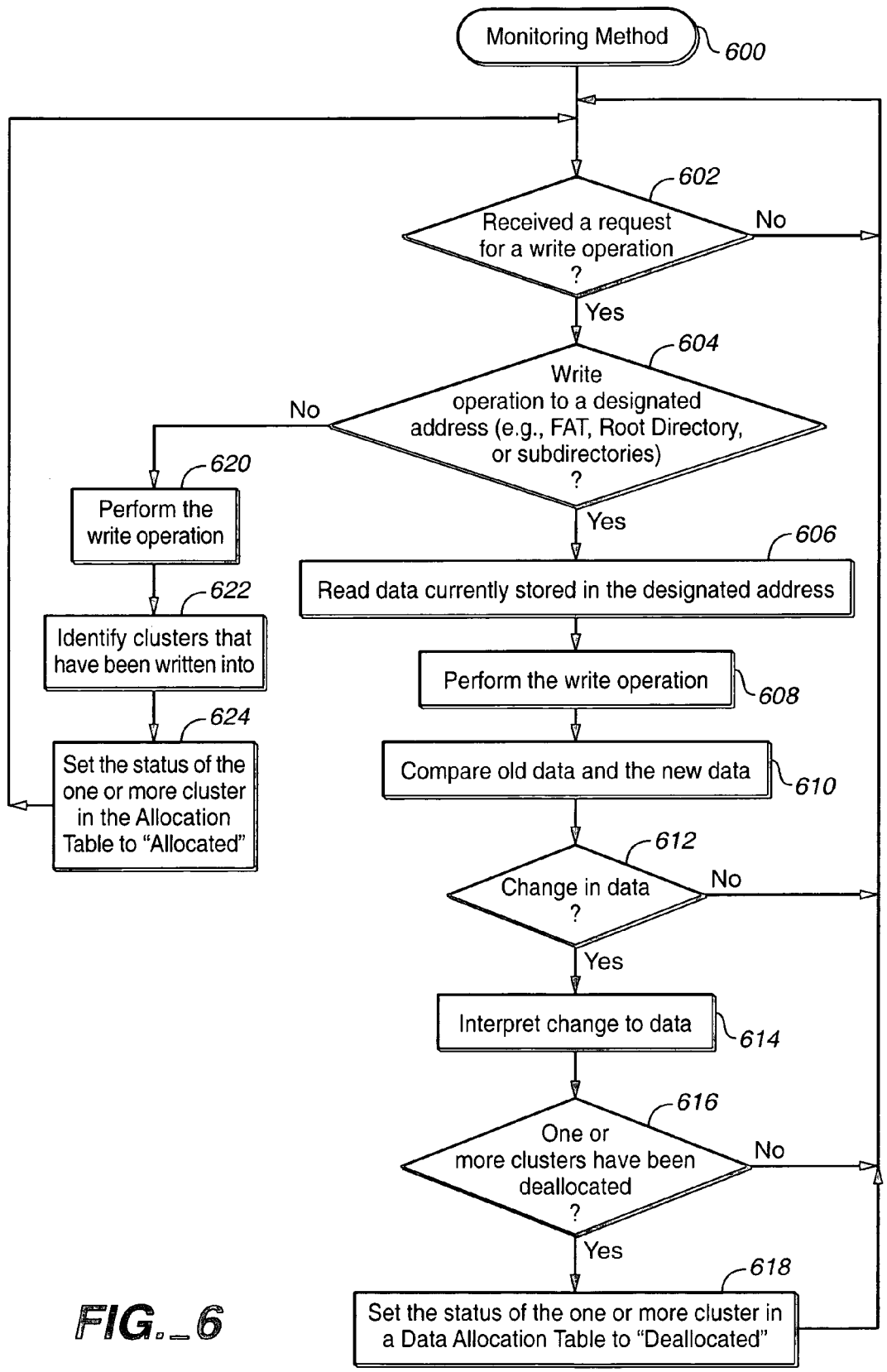
FIG._6

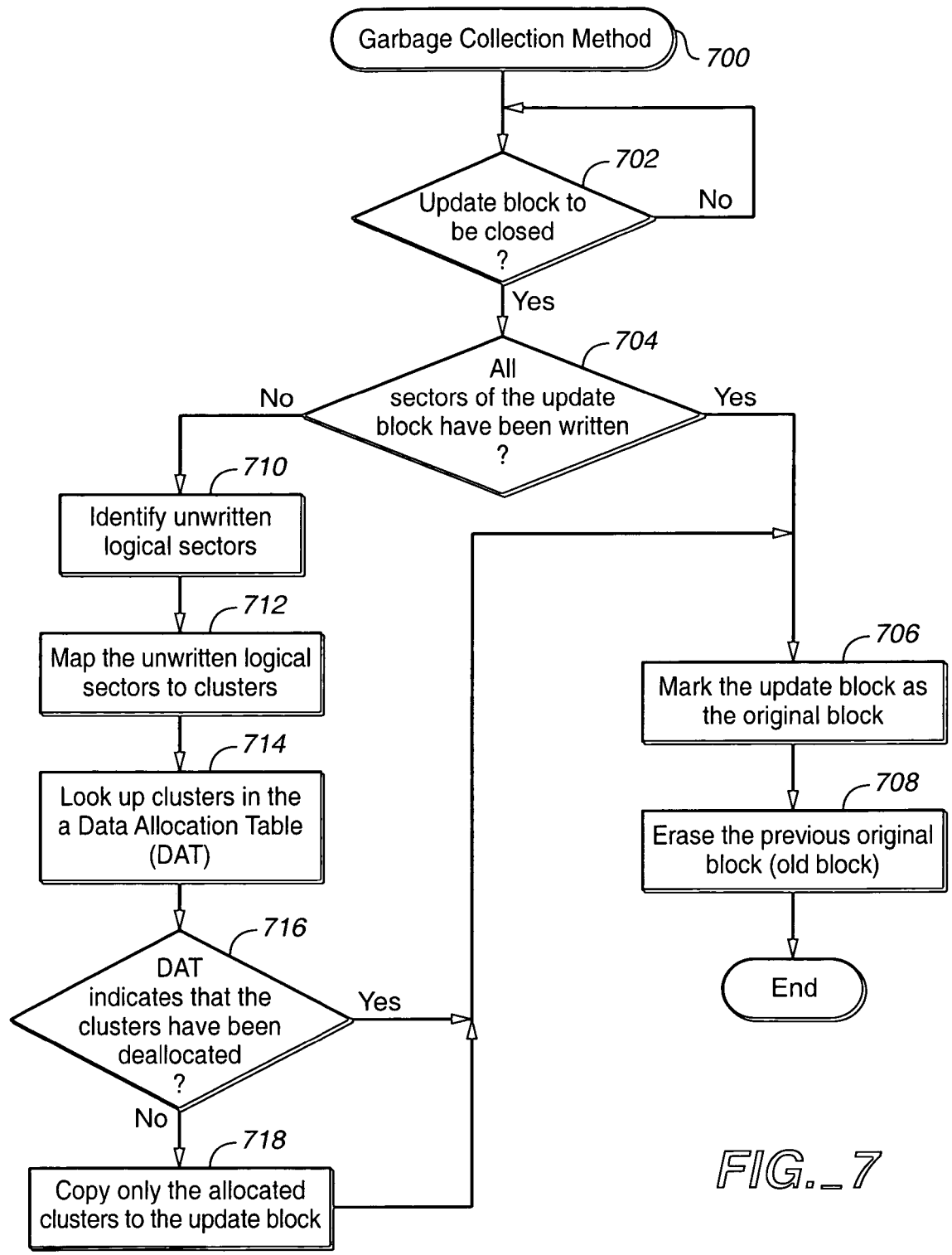
FIG._7

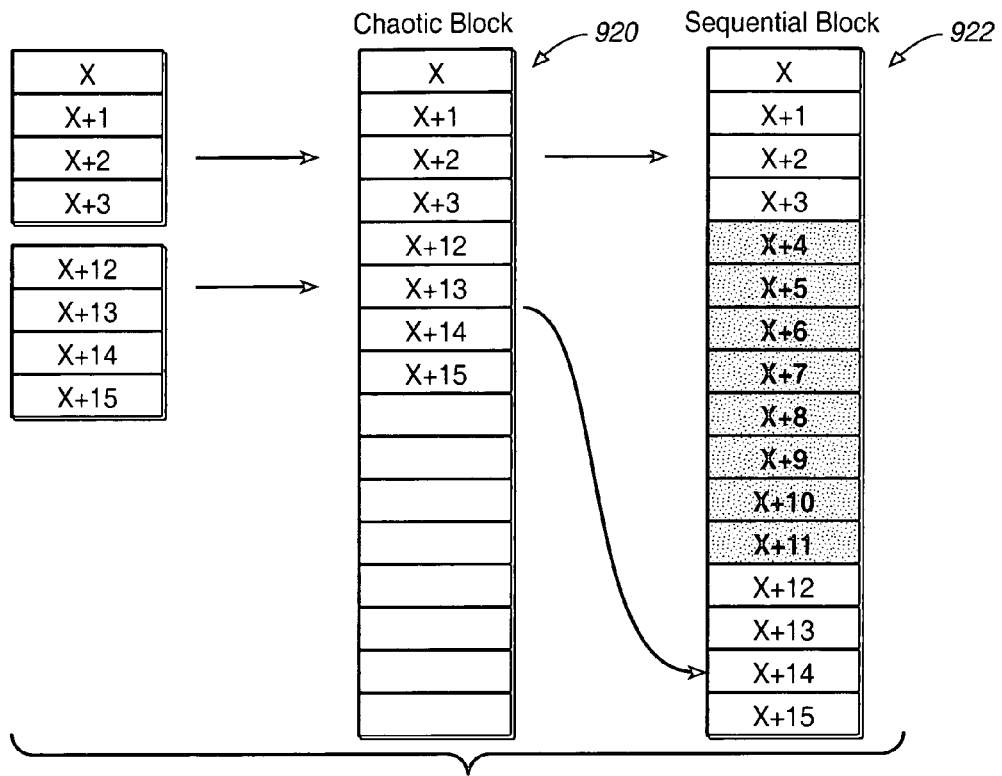
FIG._9D
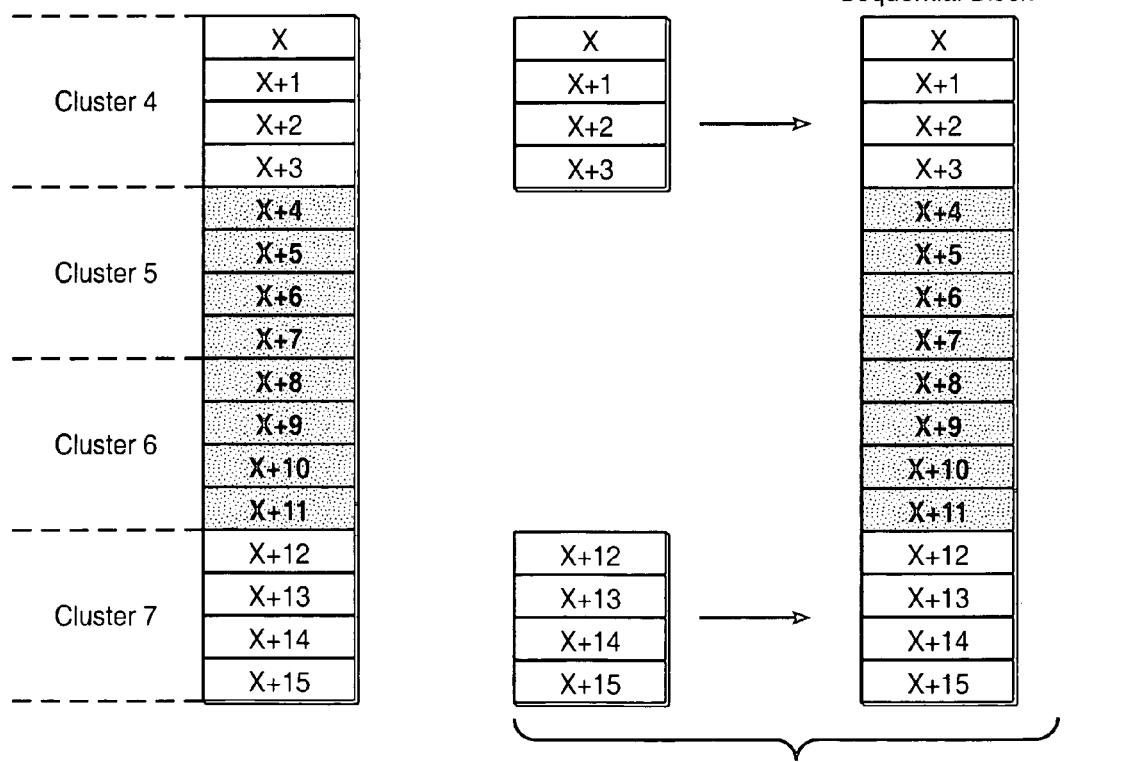
FIG._9C
FIG._9E

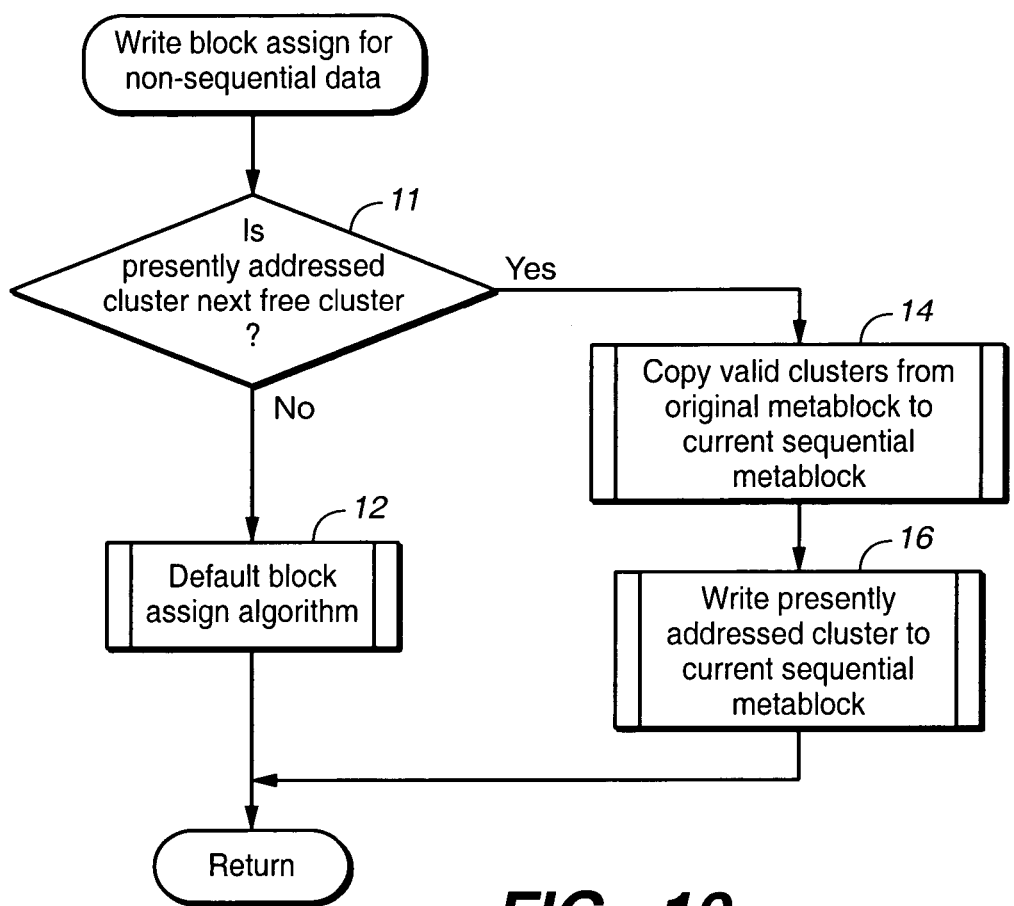
FIG._10

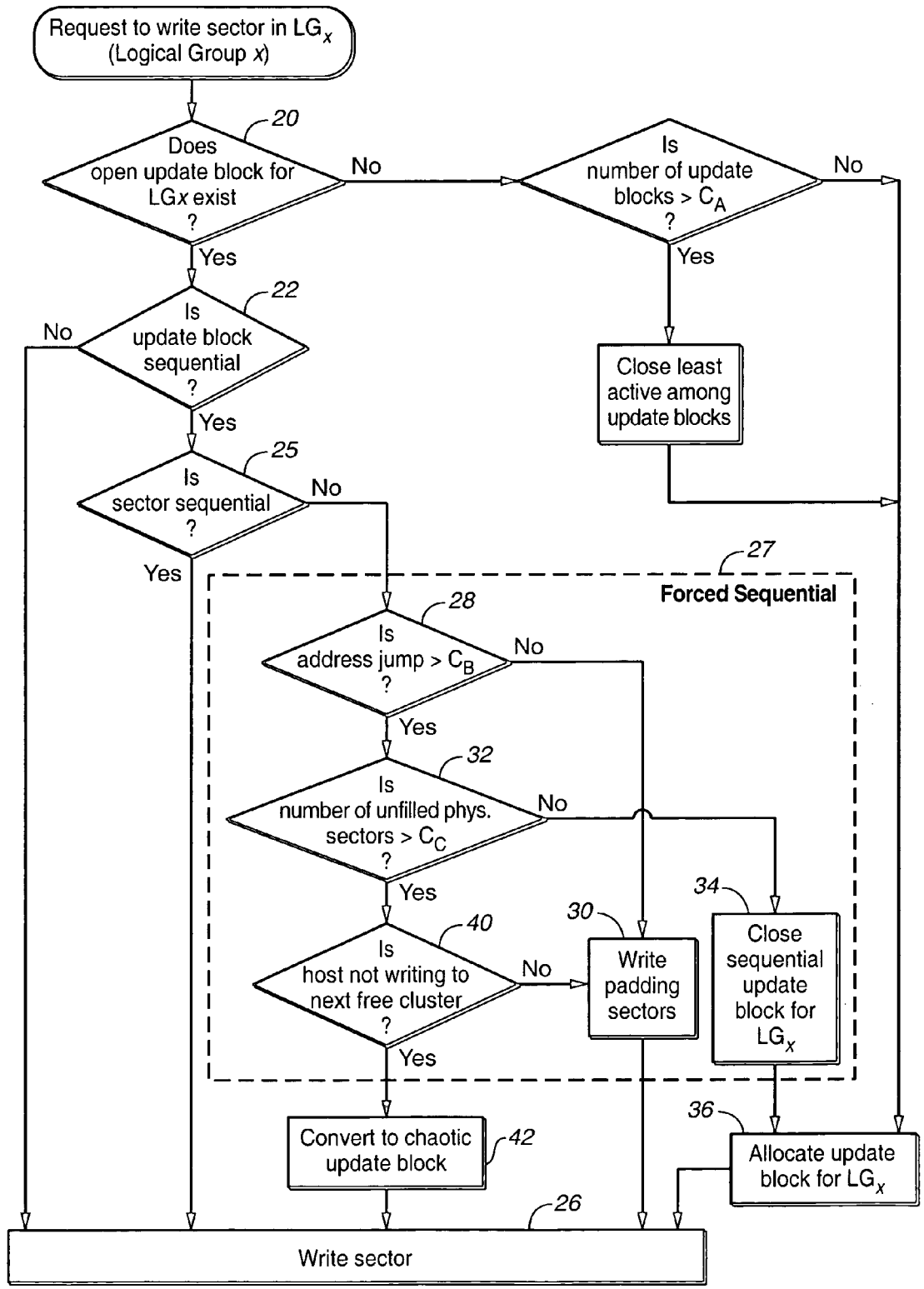
FIG._11

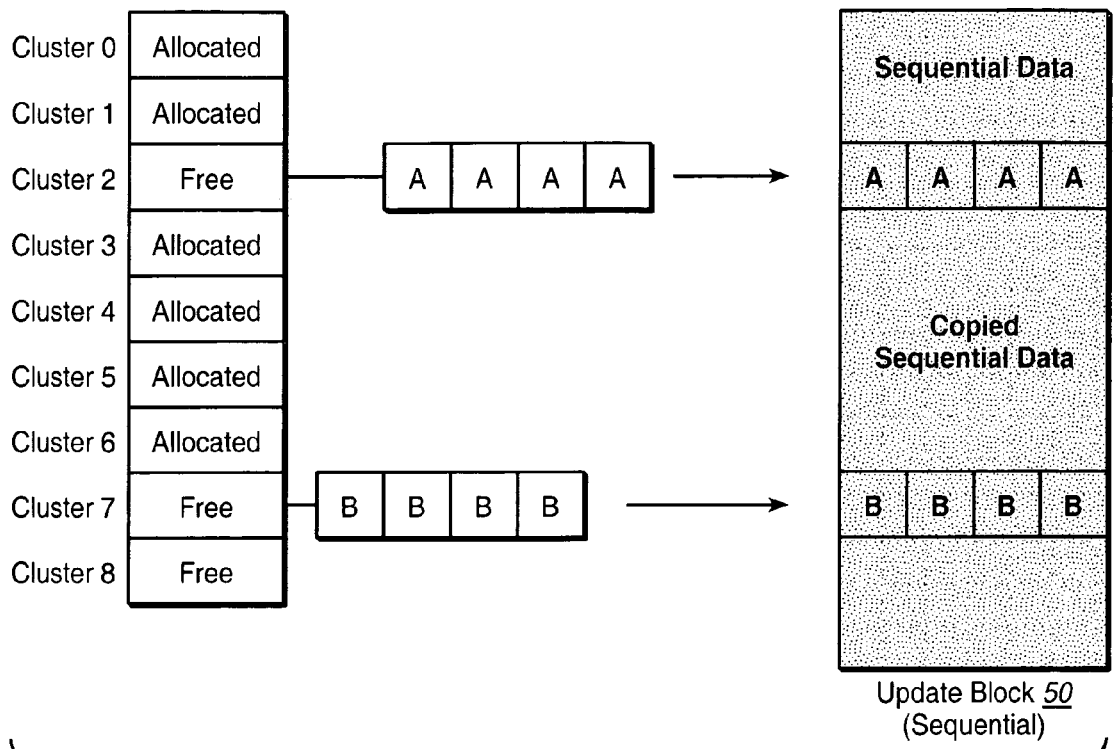
FIG._12A
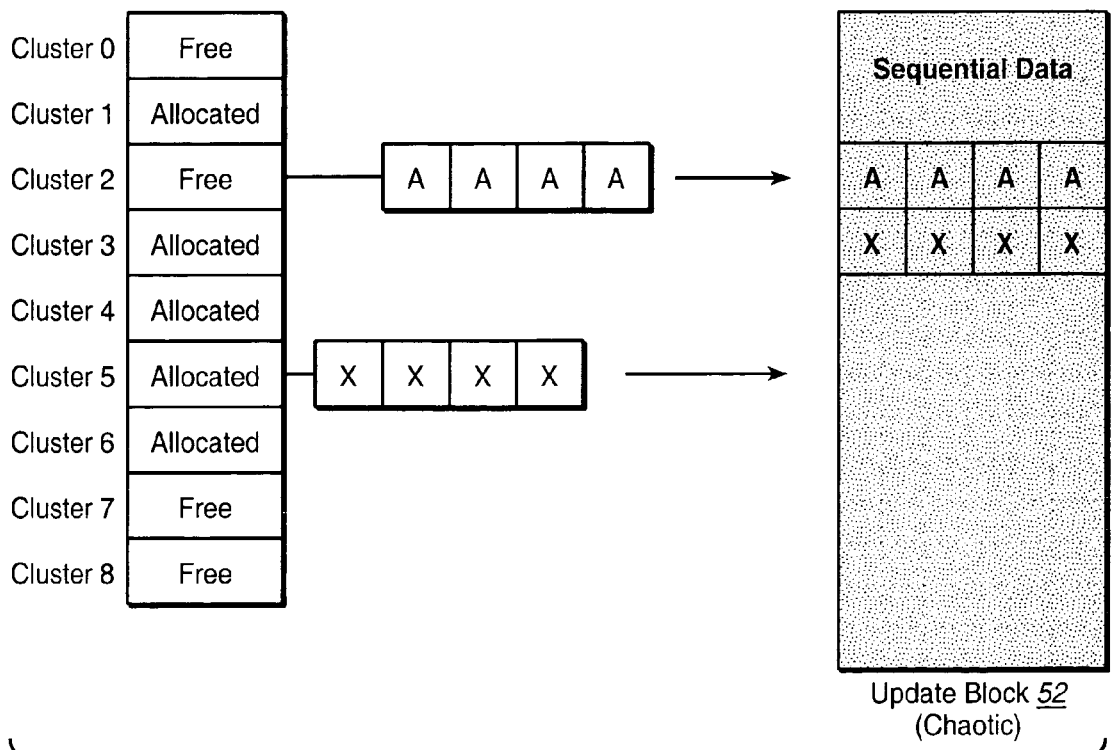
FIG._12B

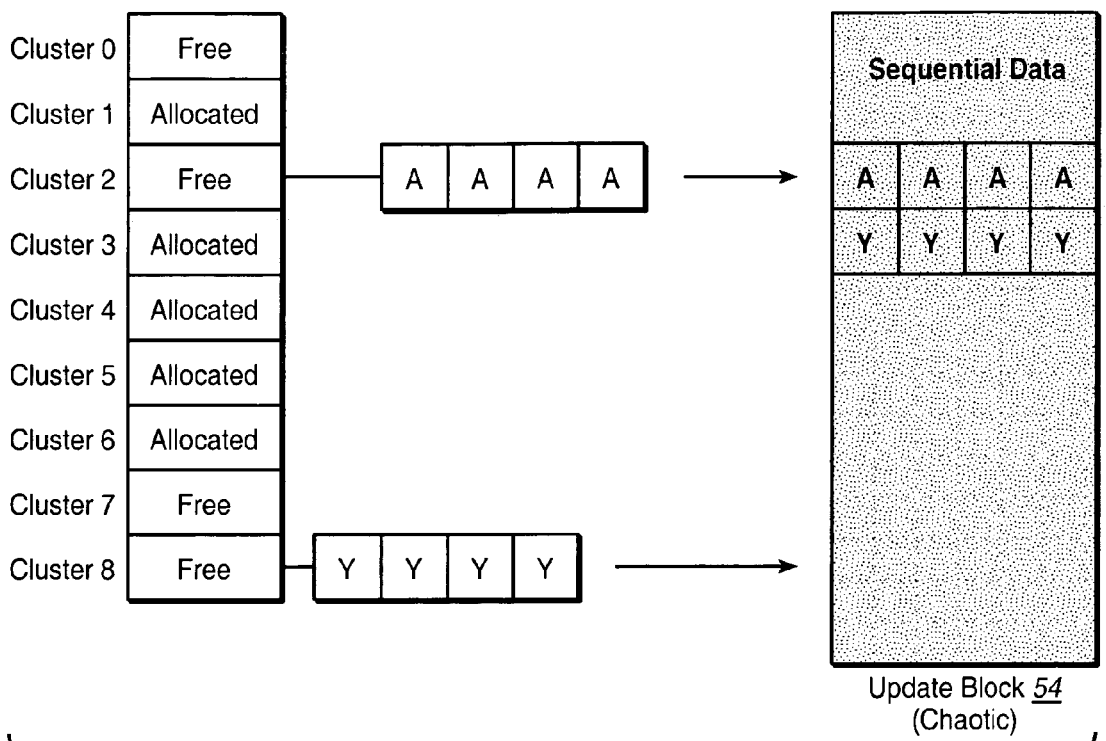
FIG._12C
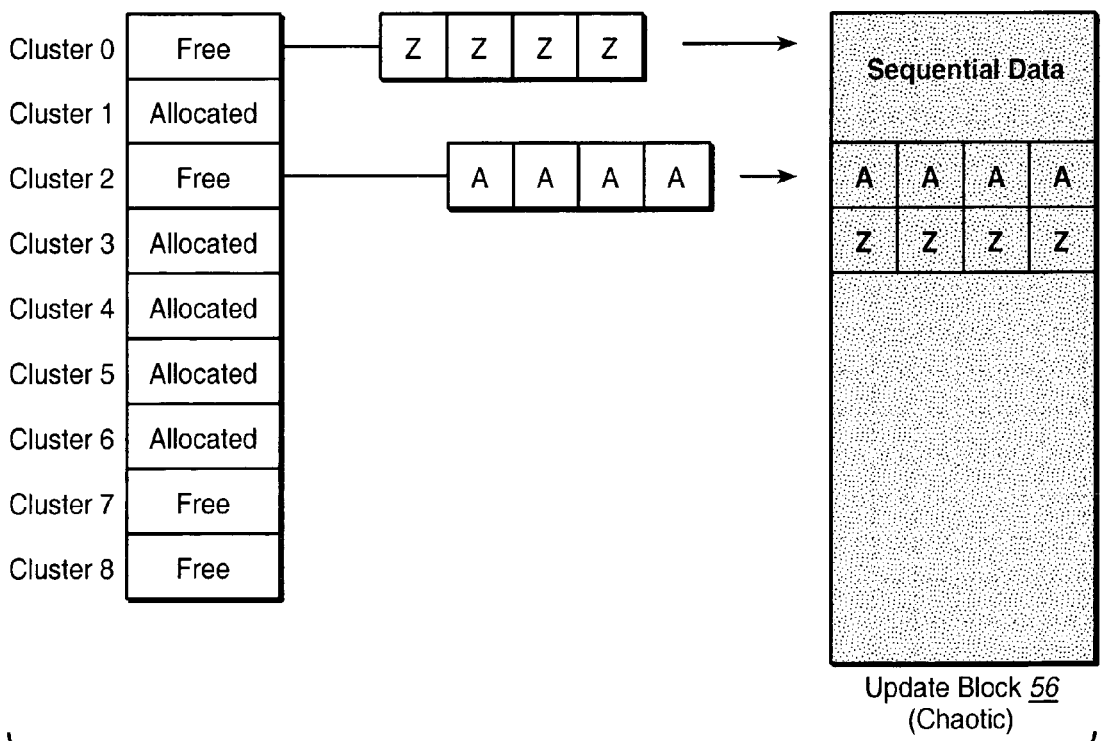
FIG._12D

FAT ANALYSIS FOR OPTIMIZED SEQUENTIAL CLUSTER MANAGEMENT

CROSS-REFERENCE TO RELATED APPLICATION

This application is a continuation-in-part of U.S. patent application Ser. No. 10/897,049 by Sinclair et al, filed, on Jul. 21, 2004, which application is hereby incorporated by reference in its entirety.

BACKGROUND OF THE INVENTION

The present invention relates generally to data storage systems for use with computing systems and, more particularly, to techniques for maintaining data on non-volatile memory storage device.

There are many commercially successful non-volatile memory products being used today, particularly in the form of small form factor cards, which employ an array of flash EEPROM (Electrically Erasable and Programmable Read Only Memory) cells formed on one or more integrated circuit chips. Typically, a memory controller on a separate integrated circuit chip is provided as an interface to a host. The host can use the controller to perform various operations (e.g., read, write) on the non-volatile memory. A controller typically includes a microprocessor, some nonvolatile read-only-memory (ROM), a volatile random-access-memory (RAM) and one or more special circuits such as one that calculates an error-correction-code (ECC) from data as they pass through the controller during the programming and reading of data. Some of the commercially available cards are Compact-Flash™ (CF) cards, MultiMedia cards (MMC), Secure Digital (SD) cards, Smart Media cards, personnel tags (P-Tag) and Memory Stick cards. Hosts include personal computers, notebook computers, personal digital assistants (PDAs), various data communication devices, digital cameras, cellular telephones, portable audio players, automobile sound systems, and similar types of equipment. Besides a memory card implementation, non-volatile memory can alternatively be embedded into various types of host systems.

As in most integrated circuit applications, the pressure to shrink the silicon substrate area required to implement some integrated circuit function also exists with flash EEPROM memory cell arrays. It is continually desired to increase the amount of digital data that can be stored in a given area of a silicon substrate, in order to increase the storage capacity of a given size memory card and other types of packages, or to both increase capacity and decrease size. One way to increase the storage density of data is to store more than one bit of data per memory cell and/or per storage unit or element. This is accomplished by dividing a window of a storage element charge level voltage range into more than two states. The use of four such states allows each cell to store two bits of data, either states store three bits of data per storage element, and so on. Multiple state flash EEPROM structures using floating gates and their operation are described in U.S. Pat. Nos. 5,043,940 and 5,172,338, and for structures using dielectric floating gates in the aforementioned U.S. patent application Publication No. 2003/0109093. Selected portions of a multi-state memory cell array may also be operated in two states (binary) for various reasons, in a manner described in U.S. Pat. Nos. 5,930,167 and 6,456,528.

Memory cells of a typical flash EEPROM array are divided into discrete "blocks" of cells that are erased together. Each erase block typically stores one or more pages of data, the page being the minimum unit of programming and reading, although more than one page may be programmed or read in parallel in different sub-arrays or planes. Each page typically stores one or more sectors of data, the size of the sector being defined by the host system. An example sector includes 512 bytes of user data, following a standard established with magnetic disk drives, plus some number of bytes of overhead information about the user data and/or the erase block in which they are stored. Such memories are typically configured with 32, 128 or more pages within each erase block, and each page stores one or just a few host sectors of data. It should also be noted that in order to re-write data to a block, the block should be erased first.

In order to increase the degree of parallelism during programming user data into the memory array and read user data from it, the array is typically divided into sub-arrays, commonly referred to as planes, which contain their own data registers and other circuits to allow parallel operation such that sectors of data may be programmed to or read from each of several or all the planes simultaneously. An array on a single integrated circuit may be physically divided into planes, or each plane may be formed from a separate one or more integrated circuit chips. Examples of such a memory implementation are described in U.S. Pat. Nos. 5,798,968 and 5,890,192.

To further efficiently manage the memory, erase blocks may be logically linked together to form virtual blocks or metablocks. That is, each metablock is defined to include one erase block from each plane. Use of the metablock is described in International Patent Application Publication No. WO 02/058074. The metablock is identified by a host logical block address as a destination for programming and reading data. Similarly, all erase blocks of a metablock are erased together. The controller in a memory system operated with such large blocks and/or metablocks performs a number of functions including the translation between logical block addresses (LBAs) received from a host, and physical block numbers (PBNs) within the memory cell array. Individual pages within the blocks are typically identified by offsets within the block address. Address translation often involves use of intermediate terms of a logical block number (LBN) and logical page. Thus, a block in a memory array may consist of a single erase block or may consist of two or more erase blocks that are logically linked to form a metablock.

From the perspective of a host application, flash memory can be divided into a logical address space starting from a logical address zero (0) and ending with a logical address N. FIG. 1 illustrates a host's logical address space 102, which is partitioned into "logical sectors". The host groups several (e.g., from four to sixty-four (4-64)) logical sectors into a cluster. As shown in FIG. 1, a host may divide the logical address space 102 into clusters that include clusters A, B, C, D, E, F, G and H. As such, each of these clusters may represent a predetermined number of sectors (e.g., from four to sixty-four (4-64) logical sectors per cluster). In any case, the host allocates data in a logical unit of data, which can be referred to as a "cluster". For example, clusters A, B and C may be used to allocate a file 1, while cluster D is used to allocate a file 2. It should be noted that the host allocates files in clusters. However, not all the logical sectors in a cluster need to contain data for a file. By way of example, only a portion (e.g., only one logical sector) of cluster C may have data. Nevertheless, the host typically allocates an entire cluster to a file even though not all the logical sectors in the cluster are needed.

A host can use a File Allocation Table (FAT) 104 to keep track of files. The File Allocation Table (FAT) 104 effectively represents a logical file structure and also indicates what cluster has been allocated for each of the files in the logical file structure. The host maintains the logical file structure by updating the File Allocation Table (FAT) 104. By way of example, when a new file is allocated, the File Allocation Table (FAT) 104 is updated to, among other things, indicate what cluster(s) has been allocated for the new file. Also, when a file or directory is deleted, the host updates the File Allocation Table (FAT) 104. It should be noted that clusters may be deallocated by the host as a result of an update. By way of example, when the host deletes file 1, an updated File Allocation Table (FAT) 106 may result where the host effectively deallocates clusters A, B, and C, which were allocated for storing file 1.

In contrast to a host's logical address space, the logical address space of a flash-memory controller is divided into "logical blocks". In other words, the same logical address space 102 may be represented as a logical address space 103 for the controller. The fundamental unit for both logical address space 102 and logical address space 103 is a sector in this example. As shown in FIG. 1, the logical address space 103 may be divided into various logical blocks, including logical block 1 and logical block 2, each logical block comprising multiple sectors of data that are mapped to a single block of the memory array. These logical blocks are mapped into blocks of memory that can be erased as a unit, for example, a single erase block or a metablock. Thus there is a one-to-one correspondence between logical blocks and blocks of the memory array, where all the sectors in a logical block are stored in a single block. For example, logical block 1 may be mapped into block 2, and so on. In summary, the host and controller use different logical units of memory. The host divides the logical address space into clusters while the controller divides the logical address space into logical blocks. It should also be noted that typically host clusters are applied to logical address space allocated for application data and sub-directory entries only. In addition, logical address space allocated for other system data may not be managed by the host as clusters. It should also be noted that the first cluster is not normally located at the beginning of the logical address space. Clusters and logical blocks may therefore not align with each other.

A conventional controller, however, is not aware of the logical organization used by the host. Conventionally, the controller simply maps the logical address 102 used by the host to a logical address 103 and then into a physical address 110. This means that a conventional controller does not consider the host's logical organization of data or consequences that a host operation may have had on data. By way of example, when a new file is allocated, the logical file system 104 is updated to, among other things, indicate what cluster(s) has been allocated for the new file. Also, when a file or directory is deleted, the host updates the logical file system 104. Moreover, one or more clusters may be deallocated by a host. By way of example, when the host deletes file 1, the updated File Allocation Table 106 indicates that the host has effectively deallocated clusters A, B, and C which were previously allocated for storing file 1 (i.e., file 1 is no longer represented in updated File Allocation Table 106). Although clusters A, B, and C have been deallocated by the host and can be erased, a conventional controller does not "garbage collect" that data corresponding to deallocated clusters A, B, and C. This means that the data will persist on memory. Garbage collection is an operation that copies valid sectors of data from an original block that contains obsolete sectors of data to an update block. When all valid sectors of data have been copied, the original block may be marked for erase. Typically, data is consolidated from two or more blocks to a single block in this way, thus storing data more efficiently and freeing space in the memory array. Unnecessary copying of data during garbage collection reduces the efficiency of such operations. In addition, the deallocated data may be copied a number of times when blocks are updated during garbage collection when data in two blocks may be consolidated into one block.

To further illustrate, an original block 120 is depicted in FIG. 1. For simplicity, it is assumed that the original block 120 includes data corresponding to logical clusters A, B, C and D used by the host to allocate files 1 and 2. Also, further assuming that the host has later deallocated file 1 (clusters A, B and C), the original block 120 still contains all the logical clusters A, B, C and D because the controller has no way of knowing that file 1 has been deallocated by the host. The host, however, has requested the controller to update data portion D of the original block 120. In other words, at some point the host may want to change file 2, so it sends a write request using the logical address it knows for data corresponding to one or more logical sectors that should be updated. The controller determines that these logical sectors addressed by the host correspond to sectors that already have been written to by the host (i.e., Cluster D), so an update block 122 is used partly because data in original block 120 cannot be overwritten. This means that two blocks may be used to represent a logical block for some time until the update block 122 is "closed" (i.e., all data in original block 120 is copied to block 122). The original block 120 and the update block 122 may be combined, for example, during a garbage collection cycle, so that the update block 122 becomes an "original" block 122 and the previous original block 120 is erased and returned to a pool of available memory blocks. In any case, it should be noted that data corresponding to the deallocated clusters (A, B, and C) are copied sooner or later to the update block 122 so that update block 122 can be closed and original block 120 can be erased. The controller may maintain a mapping table within volatile memory or non-volatile memory defining the allocation of memory blocks to logical blocks of data. Copying data stored in non-volatile memory takes a significant amount of time and resources. However, copying deallocated data (e.g., deallocated clusters A, B, and C) is not necessary. Thus, system performance can be further enhanced if deallocated data is not copied. In general, it is desirable to enhance system performance as much as possible while adhering to the addressing conventions that are widely used.

Accordingly, alternative non-volatile memory management techniques would be useful.

SUMMARY OF THE INVENTION

Broadly speaking, the invention pertains to techniques for managing data in a non-volatile memory system (e.g., Flash Memory). In accordance with one aspect of the invention, a controller can use information relating to a host's file system, which is stored by the host on non-volatile memory, to determine if one or more clusters (or one or more sectors within one or more clusters) are currently allocated. As will be appreciated, the controller can use the information relating to the host's file system, among other things, to ensure that one or more clusters (or one or more sectors) are not copied from one location to another location in the memory, for example, during a garbage collection cycle. As a result, some unnecessary operations (e.g., copying data), which are conventionally performed, can be avoided and system performance is enhanced.

It will also be appreciated that the controller may directly use the information normally written by the host in a File Allocation Table (FAT) to determine whether one or more previously allocated clusters have been deallocated. Alternatively, the controller may use the information written in the root directory, subdirectories, and File Allocation Table (FAT) to generate and/or maintain its own information about cluster allocation, for example, in a Data Allocation Table (DAT). However, it should be clear that the invention may be implemented to make use of the information normally stored in the File Allocation Table (FAT). As such, it is not necessary for the controller to maintain its own information or to generate any additional data structures (e.g., Data Allocation Table). However, as will be described below, maintaining a Data Allocation Table (DAT) may offer more advantages than solely relying on the information obtained from File Allocation Table (FAT). Therefore, a Data Attribute Store (DAS) which may, for example, be implemented as a Data Allocation Table (DAT) will also be further illustrated.

In general, a Data Attribute Store (DAS), which includes one or more attributes of data, can be maintained by the controller in the non-volatile memory. A data attribute can provide useful information about data (e.g., allocation or deallocation status, size, priority). As such, the Data Attribute Store (DAS) can be used to manage data more intelligently. Another aspect of the invention pertains to techniques for managing data using the Data Attribute Store (DAS).

In one embodiment, the Data Attribute Store (DAS) is implemented as an Allocation Store (AS). The Allocation Store (AS) can, for example, be implemented as a table, or a Data Allocation Table (DAT) that provides an allocation status for each cluster (host's logical unit) of data. A cluster represents a logical unit that the host uses in order to logically organize data. To achieve better memory management, a controller of the non-volatile memory system can access the Data Allocation Table (DAT). As such, the Data Allocation Table (DAT) effectively provides a bridge between the logical organization used by the host and the controller. This allows the controller to effectively understand the logical organization of the host. In addition, the controller monitors host activities to determine, for example, whether the host has deallocated a cluster. By way of example, root directory, File Allocation Table (FAT), and subdirectories of a DOS compliant system may be monitored to detect deallocation of a cluster of data by the host. A change in the root directory, File Allocation Table (FAT) or a subdirectory may be caused, for example, as a result of a file or a portion of the file being deleted by the host. In any case, when deallocation of one or more clusters of data have been detected, the controller updates the Data Allocation Table (DAT). Thus, the Data Allocation Table (DAT) can provide updated information about data. This information can be used to manage data more intelligently. By way of example, a deallocation status can be used to determine whether data should be copied during garbage collection. Data that has been deallocated need not be copied. As a result, some unnecessary operations, which are conventionally performed, can be avoided and system performance can be enhanced.

In another embodiment, information stored by the host in a FAT or in a DAS may be used to determine how a portion of data sent by a host should be stored. Data that is received non-sequentially may be stored non-sequentially, or alternatively, may be stored sequentially by copying data from elsewhere to fill any gaps in the received data. One case where such sequential storage is advantageous is where the host writes to available (free or deallocated) portions of logical address space (e.g. clusters). Such writing of data indicates that the host is storing new data and does not indicate any reason to store the data non-sequentially. By comparing the logical addresses of sectors of data that are sent by the host with logical address ranges of free clusters, the controller may determine if the host is writing to the next free cluster. Based on this determination, the controller may select a storage scheme for the sectors.

In one embodiment, a determination is made as to whether a sector or sectors received from a host indicate that the host is writing to the next free cluster. If so, the data is written in a block in sequential form, with any gaps in the data being filled by data copied from elsewhere in the memory array. If not, additional criteria may be considered to determine whether to store the data sequentially or non-sequentially. For example, if sectors are received from a host with a jump in logical address between sectors, the size of the jump may determine the storage scheme. If the jump is small, the resulting gap may be filled with copied data and the updated data may be kept in sequential format. In another example, where an update block is sequential and is close to being full, the update block may be filled with data to keep it sequential rather than writing a non-sequentially received sector. Storage schemes may be chosen based on information directly obtained from a copy of FAT in the non-volatile memory or may be chosen based on information in a DAS or similar structure that is derived from the FAT.

The invention can be implemented in numerous ways, including as a method, system, device, apparatus, or computer readable medium. Other aspects and advantages of the invention will become apparent from the following detailed description, taken in conjunction with the accompanying drawings, illustrating by way of example the principles of the invention.

BRIEF DESCRIPTION OF THE DRAWINGS

The invention is illustrated by way of example, and not by way of limitation, in the figures of the accompanying drawings and in which like reference numerals refer to similar elements and in which:

FIG. 1 illustrates a logical address space, which can be partitioned into several logical sectors.

FIG. 2A depicts a copy management method in accordance with one embodiment of the invention.

FIG. 2B depicts a computing environment in accordance with one embodiment of the invention.

FIG. 3A depict a data allocation table (DAT) in accordance with one embodiment of the invention.

FIG. 3B depicts an entry of a data allocation table (DAT) table in accordance with one embodiment of the invention.

FIG. 3C depicts a host's logical data organization which may be used by a controller in accordance with one embodiment of the invention FIG. 4 depicts a method for providing a flash-memory controller with information about data that is stored on flash-memory in accordance with one embodiment of the invention.

FIG. 5 illustrates a flash-memory maintenance method in accordance with one embodiment of the invention.

FIG. 6 illustrates a monitoring method in accordance with one embodiment of the invention.

FIG. 7 depicts an exemplary garbage collection method in accordance with one embodiment of the invention.

FIG. 9C shows an example of the correspondence between clusters and sectors for a portion of host data.

FIG. 9D shows non-sequential data being stored in a chaotic block and later copied to a sequential block.

FIG. 9E shows non-sequential data being stored directly in a sequential block.

FIG. 10 shows a flowchart for selecting a storage scheme for a portion of host data according to an embodiment of the present invention.

FIG. 11 shows a flowchart for selecting a storage scheme for a portion of host data according to another embodiment of the present invention.

FIG. 12A shows an example of non-sequential data that is stored sequentially.

FIG. 12B shows a first example of non-sequential data that is stored non-sequentially.

FIG. 12C shows a second example of non-sequential data that is stored non-sequentially.

FIG. 12D shows a third example of non-sequential data that is stored non-sequentially.

DETAILED DESCRIPTION OF THE INVENTION

Figure 8:
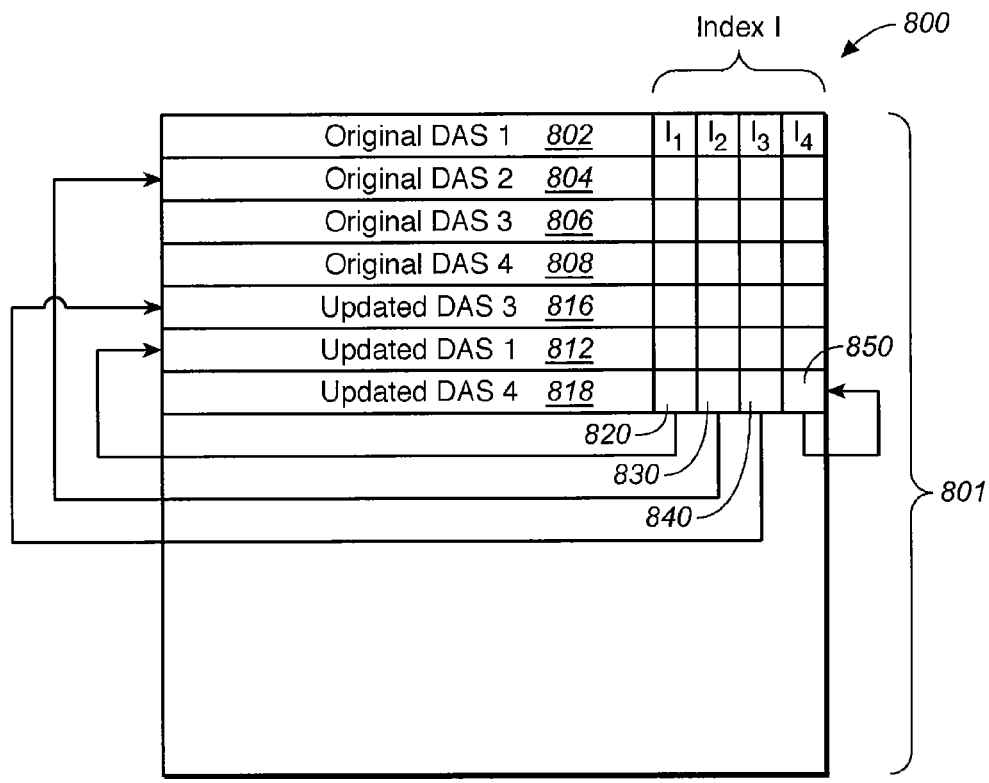
FIG. 8 depicts a Data Allocation Table (DAT) in accordance with one embodiment of the invention.

The invention pertains to techniques for managing data in a non-volatile memory system (e.g., Flash Memory). In accordance with one aspect of the invention, a controller can use information relating to a host's file system, which is stored by the host on non-volatile memory, to determine if one or more clusters (one or more sectors within one or more clusters) are currently allocated. As will be appreciated, the controller can use the information relating to the host's file system, among other things, to ensure that one or more clusters (or one or more sectors within the cluster) are not copied from one location to another location in the memory, for example, during a garbage collection cycle. As a result, some unnecessary operations (e.g., copying data), which are conventionally performed, can be avoided and system performance can be enhanced.

It will also be appreciated that the controller may directly use the information normally written by the host in a File Allocation Table (FAT) to determine whether one or more previously allocated clusters have been deallocated. Alternatively, the controller may use the information written in a root directory, subdirectories, and File Allocation Table (FAT) to generate and/or maintain its own information about cluster allocation, for example, in a Data Allocation Table (DAT). However, it should be clear that the invention may be implemented to make use of the information normally stored in the File Allocation Table (FAT). As such, it is not necessary for the controller to maintain its own information or to generate any additional data structures (e.g., Data Allocation Table (DAT)). However, as will be described below, maintaining a Data Allocation Table (DAT) may offer more advantages than solely relying on the information obtained from File Allocation Table (FAT). Therefore, a Data Attribute Store (DAS) which may, for example, be implemented as a Data Allocation Table (DAT) will also be further illustrated.

In general, a Data Attribute Store (DAS), which includes one or more attributes of data, can be maintained by the controller in the non-volatile memory. A data attribute can provide useful information about data (e.g., allocation or deallocation status, size, priority). As such, the Data Attribute Store (DAS) can be used to manage data more intelligently. Another aspect of the invention pertains to techniques for managing data using the Data Attribute Store (DAS).

In one embodiment, the Data Attribute Store (DAS) is implemented as an Allocation Store (AS). The Allocation Store (AS) can, for example, be implemented as a table, or a Data Allocation Table (DAT) that provides an allocation status for each cluster (host's logical unit) of data. A cluster represents a logical unit that the host uses in order to logically organize data. To achieve better memory management, a controller of the non-volatile memory system can access the Data Allocation Table (DAT). As such, the Data Allocation Table (DAT) effectively provides a bridge between the logical organization used by the host and the controller. This allows the controller to effectively understand the logical organization of the host. In addition, the controller monitors host activities to determine, for example, whether the host has deallocated a cluster. By way of example, root directory, File Allocation Table (FAT) and subdirectories of a DOS compliant system may be monitored to detect deallocation of a cluster of data by the host. A change in the root directory, File Allocation Table (FAT) or a subdirectory may be caused, for example, as a result of a file or a portion of the file being deleted by the host. In any case, when deallocation of one or more clusters of data have been detected, the controller updates the Data Allocation Table (DAT). Thus, the Data Allocation Table (DAT) can provide updated information about data. This information can be used to manage data more intelligently. By way of example, a deallocation status can be used to determine whether data should be copied during garbage collection. Data that has been deallocated need not be copied. As a result, some unnecessary operations, which are conventionally performed, can be avoided and system performance can be enhanced.

Embodiments of the invention are discussed below with reference to FIGS. 2A-8. However, those skilled in the art will readily appreciate that the detailed description given herein with respect to these figures is for explanatory purposes as the invention extends beyond these limited embodiments. For example, although the description refers to flash-memory, other types of non-volatile memory can be used. Other types of non-volatile memory include Magnetoresistive RAM (MRAM), Ferroelectric RAM, and phase change memory (also known as Ovonics Unified Memory or OUM).

As noted above, a controller can use information relating to a host's file system, which is stored by the host on non-volatile memory, to determine if one or more clusters (or sectors within clusters) are currently allocated in accordance with one aspect of the invention. The controller can use the information relating to the host's file system, among other things, to ensure that one or more clusters (or a sector within a cluster) are not copied from one location to another location in the memory during a garbage collection cycle. To further illustrate, FIG. 2A depicts a copy management 250 in accordance with one aspect of the invention. Initially, the host uses a non-volatile memory device to store (252) information for use by a file system. Next, the controller uses the information stored (252) by the host to determine (254) if one or more clusters (or one or more sectors within one or more clusters) are currently allocated to any valid files. As will be appreciated by those skilled in the art, the controller may directly use the information normally written by the host in a File Allocation Table (FAT) in order to determine (254) if one or more clusters (or one or more sectors within one or more clusters) are currently allocated to any valid files. Alternatively, the controller may use the information written in a root directory, subdirectories, and FAT together with the sequence of logical sectors written by host to the device, in order to generate and maintain its own information about cluster allocation. For example, the controller may generate and/or maintain its own Data Allocation Table (DAT). In any case, the controller ensures (256) that any cluster (or sectors within a cluster)

which are determined (254) to be currently NOT allocated are not copied from one location to another during a garbage collection operation within memory. In other words, a cluster or (a sector within a cluster) is only copied if it is determined (254) that the cluster (or a sector within a cluster) is currently allocated. The copy management method 250 ends following operation 256.

As noted above, maintaining a Data Allocation Table (DAT) may offer more advantages than solely relying on the information obtained from File Allocation Table (FAT). As will become apparent to those skilled in the art, the FAT may not always indicate that a cluster has been deallocated. For example, chains of cluster entries may exist in the FAT without being linked to any file reference in a directory.

When a file is deleted, its directory entry is modified by the file system in the host (first character of filename changed to 0xE5) to signify that the file has been deleted. However, the cluster entries in the FAT may retain their chaining information as if they were still allocated to a file. Algorithms for reusing clusters, and for updating a FAT cluster entry to "0x0000" to signify unused, are typically a function of the specific file system implementation in the host. The DAT can use changes in directory or subdirectory information to allow cluster attribute to reflect the current allocation status of that cluster to a file, without relying on the host file system. For some environments, implementation of DAT may even be safer than solely relying on FAT. When FAT is solely used to ascertain allocation status of clusters, a memory system may not know about allocation of a cluster to a file until the host updates the FAT at the end of the file. Therefore, if a host modifies part of a file already written, before writing the FAT, the controller may discard some valid data that still has a deallocated status. Implementation of a DAT can effectively address this issue.

In addition, a Data Allocation Table (DAT) provided in accordance with the principles of the invention may also provide features that are not typically provided by FAT. For example, the FAT defines a single allocation status for a cluster. A DAT, however, can be implemented to, for example, allow a multi-bit status to be recorded, allowing allocation status to be resolved to a sector, or group of sectors, within a cluster. This allows the controller to avoid copying unallocated sectors between files, where the last cluster of the first file is only partially used. Given the advantages and additional features that a DAT may provide, the embodiments described below further illustrate a controller that maintains its own information in a Data Attribute Store (DAS) (e.g., a DAT). However, it should be evident that a controller may solely rely on the FAT to determine allocation status associated with various files used by the host without departing from the scope and spirit of the invention.

FIG. 2B depicts a computing environment 200 in accordance with one embodiment of the invention. In the computing environment 200, flash-memory controller 202 allows a host application 204 to access a non-volatile memory (e.g., flash memory 206). In other words, the host application 204 uses the flash memory controller 202 as an interface to the flash memory 206. Hence, the host application 204 can request that the flash-memory controller 202 perform various access operations (e.g., read, write) on the flash memory 206. The host application 204 can use a logical address space to address data. The flash-memory controller maps the host's logical address space into a controller logical address space, which is in turn, mapped to a physical address space on the flash-memory 206.

Moreover, the flash-memory can build and maintain a Data Attribute Store (DAS) 208. The DAS 208 includes information about various attributes associated with data stored in flash-memory 206. By way of example, the attributes of data stored in Data Attribute Store (DAS) 208 can include allocation status of data, size of allocated data, priority. In general, the Data Attribute Store (DAS) 208 can store any desirable data attribute and represents the attribute with one or more bits of information. It should be noted that the flash-memory controller 204 provides a data attribute monitor 210 to monitor the activity of the host application 204. The data attribute monitor 210 can interpret the activities of the host application 204 with respect to data stored on flash-memory 206. This means that the data attribute monitor 208 can determine where a data attribute should be changed and update the data attribute in the DAS 208 accordingly.

To further illustrate, FIG. 3A depicts Data Attribute Store (DAS) 208 in accordance with one embodiment of the invention. In this embodiment, the data attribute store 208 is implemented as a Data Allocation Table (DAT) 308. As such, DAT 308 provides information about allocation/deallocation status of various data portions of a non-volatile memory system. As will be appreciated, these various data portions can be organized in accordance with a logical data organization, namely, the logical data organization used by the host application 204. As noted above, a host application may organize data into host logical units, which can be referred to as clusters. The DAT 308 can be partitioned into units that represent these clusters.

This means that each of the logical clusters used by a host application can be represented as an entry in the DAT 308. For example, cluster 1 can be represented by the first ($1^{st}$) entry, cluster 10 by the tenth ($10^{th}$) entry, and so on. Moreover, each entry of the DAT 308 can indicate the Allocation/Deallocation status of a cluster. For example, one bit can be used for each entry of the DAT 308 to indicate whether a logical cluster is currently allocated or deallocated. It should be noted that several bits can be used to provide more information about an attribute and/or information about several attributes. In any case, the DAT 308 allows for better management of data. By way of example, based on allocation/deallocation status of a data portion, the flash-memory controller may avoid copying data, which has been deallocated by a host application.

To further illustrate, FIG. 3B depicts an entry 302 of the DAT 208 in accordance with one embodiment of the invention. The table entry 302 includes 4 bits wherein the first bit (bit j) can provide an allocation/deallocation status, and three (3) other bits (bits 1-3) collectively can indicate how much data has been allocated (e.g., "100" to indicate half full, and "111" to indicate full, etc.). Similarly, more bits may be used to provide information about another attribute of the cluster. By way of example, each cluster can be represented by four (4) bits, wherein one (1) bit represents a deallocation status and three (3) bits indicate what portion of the cluster has been deallocated. As will be apparent to those skilled in the art, multiple bits for a cluster may be defined in numerous other ways. For example, the polarity (or order) can be reversed or more bits can be used (e.g., 6, 8, 12). Alternatively, all bits can be allocated to indicate the number of "sub-clusters" of sectors that are fully deallocated and a fully allocated cluster may, for example, be marked with all bits set to zero (0).

As noted above, a data attribute monitor 210 monitors the activity of a host application 204. Based on this monitoring, the data attribute monitor 210 can update a Data Attribute Store (DAS) 208. As shown in FIG. 2, in order to interpret the activities of the host application 204, the data attribute monitor 210 needs to realize the logical organization of data, which the host understands and uses. To further illustrate, FIG. 3C depicts a host's logical data organization, which may be used by a controller in accordance with one embodiment of the invention. As shown in FIG. 3C, a host may divide the logical address space into a system 310 and a user space 312. The system data 310 may include: a File Allocation Table 1 (FAT1), FAT2 (a copy of FAT1), and Root Directory information, which all may be stored as system data 310. The user space may include information about subdirectories. The data attribute monitor 210 may monitor FAT1, FAT2, Root Directory, and the subdirectories to determine whether the host application 202 has deallocated any data (e.g., removed a file, made a file shorter, etc.). The monitoring of data will also be described below with reference to FIG. 6.

However, referring now to FIG. 4, a method 400 for providing a flash-memory controller with information about data stored on flash-memory is depicted in accordance with one embodiment of the invention. The information about data can be used by the flash-memory controller, for example, to make informed decisions about data during data maintenance (e.g., garbage collection). The method 400 can, for example, be used by the flash-memory controller 202 of FIG. 2.

Initially, a Data Attribute Store (DAS) is generated (402) for a controller of a flash-memory storage device. The Data Attribute Store (DAS) provides one or more attributes for each of a plurality of data portions in a flash-memory storage device. The activity of a host that uses the controller to access data is monitored (404). Next, based on the monitoring (404), it is determined (406) whether an attribute relating to a data portion of the flash memory storage device should be updated. Accordingly, at least one attribute relating to at least one data portion is updated (408) if it is determined (406) that an update should be performed for at least one data portion of the flash-memory storage device. After the update (408), the activity of the host is monitored 404. Thereafter, the method 400 can proceed in a similar manner as described above until monitoring of data is no longer desired or needed.

As noted above, a Data Attribute Store (DAS) can be provided and used by the flash-memory controller to perform maintenance operations (e.g., garbage collection). FIG. 5 depicts a flash-memory maintenance method 500 in accordance with one embodiment of the invention. Initially, it is determined 502 whether a flash-memory controller needs to perform a maintenance operation on a portion of data stored on the flash-memory storage device. If it is determined 502 that the controller needs to perform a maintenance operation, it is determined 504 what portion of a Data Attribute Store (DAS) provides information about the portion of data that is to be maintained. Accordingly, at least one attribute relating to the data portion is read 506 from the Data Attribute Store (DAS). Finally, the operation is performed 508 based on the at least one data attribute. It should be appreciated that the maintenance operation can be performed more intelligently based on the information that is provided by the at least one data attribute.

FIG. 6 depicts a monitoring method 600 in accordance with one embodiment of the invention. The monitoring method 600 illustrates some exemplary operations that can be performed during monitoring and updating operations illustrated in FIG. 4 (i.e., operations 404, 406 and 408 of FIG. 4). The monitoring method 600 can, for example, be performed by a flash-memory controller. Initially, it is determined (602) that a request for a write operation is received. Next, it is determined whether the write operation addresses a designated address space. By way of example, the designated address space can include FAT1, FAT2, a root directory and subdirectories of a logical address space addressed by a host operating in a DOS environment. Designated address space for subdirectories may be determined from information in the root directory and in other subdirectories. In general, a designated address space represents an address space where the host activities may indicate that data has been deallocated (e.g., removing or modifying directories of files, editing files, etc.). In any case, if it is determined at operation 604 that the write operation is to a designated address space, the data currently stored in the designated address space is read (606). Next, the write operation is performed (608). After the write operation is performed (608), the old data which is previously read (606) is compared (610) to data written (608). Accordingly, it is determined (612) whether there is a change in data. If it is determined (612) that there is no change in data, it is determined (602) whether a request for a write operation is received.

Alternatively, in a flash memory system in which updated data is written in a different location from the old data, comparison (610) may be made directly between data at the old and new locations, without performing previous read (606).

However, if it is determined (612) that a change to data has been detected, the change is interpreted (614) to determine (616) whether one or more clusters have been deallocated. If it is determined that no cluster has been deallocated, it is determined (602) whether a request for a write operation is received. However, it should be noted that if it is determined (616) that one or more clusters have been deallocated, the status of the one or more clusters in a Data Allocation Table (DAT) is changed to indicate a "deallocated" status. Accordingly, the monitoring method 600 effectively updates (618) a Data Allocation Table (DAT) when a change in data in a designated address space is perceived (616) to have resulted in deallocation of data.

On the other hand, if it is determined (604) that the write operation is not to a designated address space, the write operation is performed (620). In addition, the clusters that have been written in are identified (622), so that the status of one or more identified clusters can be set to "allocated". As will be appreciated, this operation ensures that entries of a DAT that represent the identified clusters are set to "allocated" when a write operation is performed in the non-designated address space. After setting (624) of the status of the clusters represented in DAT to "allocated", it can be determined (602) whether a request for a write operation has been received.

As noted above, a Data Attribute Store (DAS) can, for example, be used to perform maintenance operations. To further illustrate, FIG. 7 depicts an exemplary garbage collection method 700 in accordance with one embodiment of the invention. As will be appreciated, the garbage collection method 700 utilizes a Data Allocation Table (DAT), to enable better updating of blocks during update operations. Initially, when it is determined (702) initially that an update block is to be closed, it is determined whether all sectors of the update block have been written to. If all logical sectors of the update block have been written into, the update block can effectively replace the original block. Accordingly, the update block is marked (706) as the original block, and the previous original block is erased (708) so that it can be used later.

On the other hand, if it is determined (702) that all sectors of the update block have not been written into, the logical sectors that correspond to the unwritten sectors are identified (710). The identified (710) logical sectors are then mapped (712) to clusters. The clusters are looked up (714) in the Data Allocation Table (DAT). Accordingly, it is determined 716 whether the DAT indicates that all of the identified (710) clusters have deallocated. If DAT indicates that all clusters are deallocated, the update block is marked (706) as the original and the old block is erased (708).

It should be noted that one or more clusters are not copied when DAT indicates (716) that all clusters have been deallocated. Data that remains allocated is copied (718) to the update block only when DAT table indicates that one or more clusters are still allocated. In any case, it should be noted that an update block may be closed immediately or at a later time when it is full. The update block can be marked 706 and the previous original block (old block) is erased 708, but unnecessary copying of unallocated data is avoided. The garbage collection method 700 ends following erasure (708).

As will be appreciated, flash-memory can be used to implement a Data Attribute Store (DAS) in accordance with one embodiment of the invention. To further illustrate, FIG. 8 depicts a Data Allocation Table (DAT) 800 in accordance with one embodiment of the invention. A memory portion 801 is used to implement the Data Allocation Table (DAT) 800. Memory portion 801 may be a block that is erasable as a unit. The memory portion 801 is larger than memory needed to represent the Data Allocation Table (DAT) 800. Each section may be located in one or more pages, where a page is the minimum unit of programming of the memory.

As shown in FIG. 8, the Data Attribute Store (DAS) 800 can be portioned into a plurality of sections, namely, original sections DAS1 (802), DAS2 (804), DAS3 (806) and DAS4 (808) which are originally written at the beginning of the memory portion 801. Each of these original sections can represent a plurality of clusters which are used by a host to logically organize data. When a data attribute associated with a cluster needs to be updated, the corresponding section of the Data Attribute Store (DAS) 800 can be updated by writing an update section for the appropriate original section of the Data Attribute Store (DAS) 800. This update section is written after the last original section, namely DAS4 (808). By way of example, original DAS3 (806) is updated by writing a new section 816. Similarly, when there is a need to update original DAS1 (802), a new section 812 can be written. A new section 818 is written to represent original DAS4 (818), and so on.

In addition, an indexing scheme can be used to maintain the Data Allocation Table (DAT) 800. As shown in FIG. 8, each section of memory includes an index portion. This index portion of the last entry (806) references the current sections of the Data Attribute Store (DAS) 800. This means that indexes 820, 830, 840 and 850 respectively point to the first, second, third and fourth current sections (DAS1, DAS2, DAS3, DAS4) of the Data Attribute Store (DAS) 800. The memory portion 801 can be garbage collected, for example, when the memory 801 is essentially full so that the current sections (DAS1, DAS2, DAS3, DAS4) are reproduced as original sections.

It should also be noted that the invention can be implemented so that the use of the Data Attribute Store (DAS) is discretionary. The use of Data Attribute Store (DAS) can, for example, be dependent on system compliance, which is determined by a verification process to ensure that the host's actual logical organization of data adheres to an expected data organization for a particular operating environment (e.g., DOS). Alternatively, use of Data Attribute Store (DAS) may be enabled by the transmission of a command by the host to signify that it complies with data organization for a particular operating environment. It should be noted that it is not necessary for the Data Allocation Table (DAT) to change the status of a cluster (or sectors within a clusters) as soon as an allocated cluster is deallocated. In other words, believing that a cluster is still allocated when it has been deallocated does not pose a serious problem. As such, it is possible to wait to set an allocation status to deallocated. As will be appreciated, setting the allocation status to deallocated for a group of clusters at one time, rather than one by one at different times, may further enhance system performance. On the other hand, those skilled in the art will appreciate that the status information for a valid, allocated cluster should always be strictly accurate and current (i.e., an allocated cluster should always be marked as allocated). To ensure that allocated clusters are correctly marked, allocation status of a cluster can automatically be set to allocated every time a host writes data to the cluster. Also, it will be appreciated that information in the Data Allocation Table (DAT) may be updated at the same time as the information in a mapping table, defining allocation of physical memory blocks to logical blocks of data, to record sectors or clusters recently written.

In addition, it will be appreciated that the Data Attribute Store (DAS) can be used for many other maintenance operations. By way of example, when the Data Attribute Store (DAS) indicates that all clusters corresponding to a block has been deallocated, the block can be erased. This erasure may, for example, be performed as a background to further enhance performance.

In another embodiment, information stored by the host in a non-volatile memory may be used to determine how data received from a host should be stored. In one example, information stored by a host in FAT and directories may be used to determine whether data should be stored in a sequential manner or in a non-sequential (chaotic) manner.

Certain memory systems use different storage schemes for storing data received from a host depending on whether the data is sequential or non-sequential. For example, U.S. patent application Ser. No. 10/750,155 entitled "Non-volatile memory and method with block management system," filed on Dec. 30, 2003, and hereby incorporated by reference in its entirety, describes certain techniques for dealing with data that is sent by a host in a non-sequential manner. In particular, sequential updates may be assigned to sequential update blocks while non-sequential updates may be assigned to chaotic update blocks in which data may be stored in any order. While storage of data in chaotic update blocks offers advantages for certain types of data updates, it may cause inefficiency for other types of data updates. For this reason, application Ser. No. 10/750,155 describes techniques for storing certain non-sequentially received data in a sequential manner where predetermined criteria are met. In an embodiment of the present invention, criteria for determining whether to sequentially or non-sequentially write data to the non-volatile memory when data is received non-sequentially may be determined from analysis of information stored by the host in non-volatile memory. U.S. patent application Ser. No. 10/749,831, entitled "Management of non-volatile memory systems having large erase blocks," filed on Dec. 30, 2003, and hereby incorporated by reference in its entirety, describes additional methods of management of data sent by a host for storage in a non-volatile memory array. In particular, methods for managing data that is updated by a host in a non-sequential manner are described. Different designated blocks may be used for data according to predetermined criteria.

In an embodiment of the present invention, the logical address of a data portion (for example, a sector) being written by a host may be compared with the FAT, root directory and subdirectory (or similar host data stored in non-volatile memory) or may be compared with derived information such as information stored in a DAS, to determine whether the data portion being written has a logical address in the next free cluster. If the data portion has an address in the next free cluster, this indicates that the host is storing new data at the next available location. In a storage pattern such as this, it may be advantageous to store the data sequentially and fill any gaps in the update blocks by copying data that is already stored in the non-volatile memory, as opposed to storing the data in a non-sequential order and later copying it to a location where it is sequentially stored.

Figures 9A, 9B:
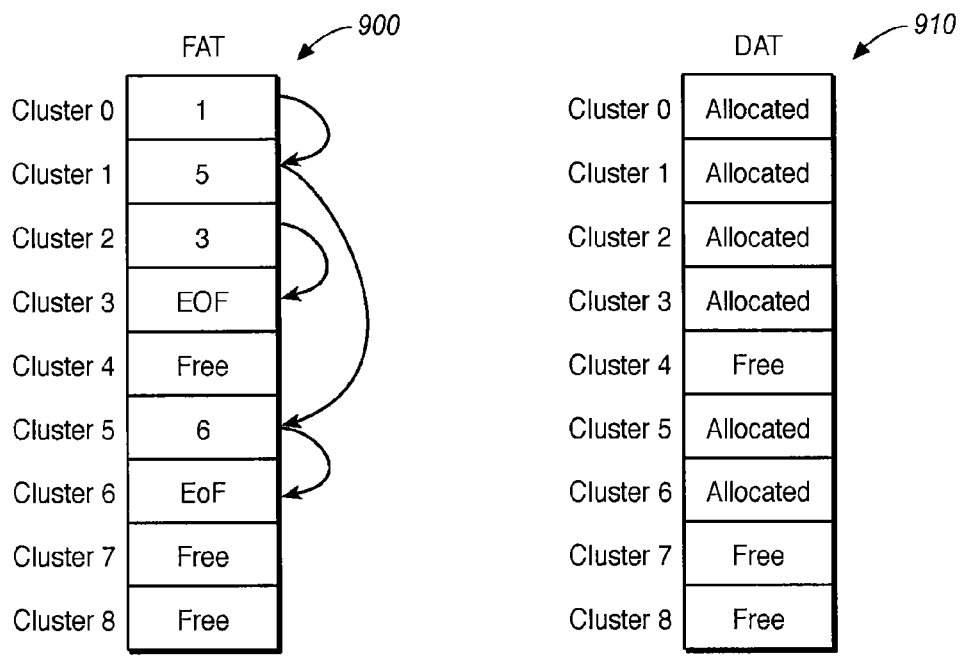
FIG. 9A shows an example of a File Allocation Table (FAT).
FIG. 9B shows a DAT that his derived from the FAT of FIG. 9A.

FIG. 9A shows an example of a FAT table 900. Each cluster 0-8 has an entry in the FAT table that indicates the next cluster in a file. Thus, the entry for cluster 0 is a "1" indicating that the next cluster for this file is in cluster 1. The entry in cluster 1 is a "5" indicating that the next cluster is cluster 5. The entry in cluster 5 is a "6" indicating that the next cluster is cluster 6. The entry in cluster 6 is "EOF" indicating "End Of File," or that no more clusters contain data for this file. Another file is similarly stored in clusters 3 and 4. Clusters 4, 7 and 8 are indicated to be "Free" or not allocated. This may be the result of deallocation by the host, for example where a file is made obsolete. It should be noted that deallocation by the host does not necessarily mean that the data is erased in the non-volatile memory, the logical address range used to store the file is simply made available for storage of new data. The obsolete data may remain physically stored in the non-volatile memory until some later time. Clusters containing obsolete control information may also be deallocated. A root directory or subdirectory also stored by the host in non-volatile memory may indicate the first cluster of a file.

FIG. 9B shows a DAT 910 that is derived from FAT 900, along with information contained in the root directory and subdirectories. DAT 910 contains an entry for each cluster indicating whether the cluster is allocated or free. Additional data may also be stored in DAT 910 as previously described. A DAT may be maintained so that the information stored in the DAT is more current than the information in FAT and directories. A DAT may be updated as soon as the host sends new data for storage, before the updated FAT or directory information are written by the host. Similarly, other information in a DAS may be maintained so that it is current.

FIG. 9C shows the correspondence between sectors and clusters for a portion of the logical address range of FAT 900. In this example, a cluster has four sectors of data. Clusters having different numbers of sectors may also be used. Typically, clusters contain between 4 and 64 sectors. Cluster 4 has sector X, sector X+1, sector X+2 and sector X+3. While allocation of a range of logical addresses by a host is generally done on a cluster-by-cluster basis, the memory controller generally deals with data in sectors. Generally, a cluster is allocated as a single unit so that even if the entire logical address range of the cluster is not used for storage of data, the entire logical address range of the cluster is made unavailable for later storage of other data. FIG. 9C shows sectors from allocated clusters 5 and 6 as shaded to indicate that these logical addresses are not available to the host for storage of data.

FIGS. 9D and 9E show two alternative schemes for storage of data received from a host non-sequentially. Both drawings show sectors X to X+3 and X+12 to X+15 being received from a host for storage in non-volatile memory. These sectors correspond to clusters 4 and 7 of FIG. 9C. In FIG. 9D the received data is written to a chaotic update block 920. This block is chaotic because sector X+12 is written immediately after sector X+3 so that there is a jump in logical address range from sector X+3 to sector X+12. Chaotic block 920 may start out being a sequential update block when it contains sectors X to X+3 and then be converted to a chaotic update block when sector X+12 is stored. In general, where the host sends data in a non-sequential manner, a chaotic (non-sequential) block will be used. The valid data in chaotic block 920 of FIG. 9D is eventually relocated to a sequential block 922, where it is stored with sectors X+4 to X+11, which may be copied from another location. This is generally done as part of a consolidation operation. Sequential blocks are generally preferable for long-term storage because sectors are arranged in a predetermined manner and thus no indexing of sectors within a block may be required. After all the valid data in chaotic block 920 is copied to another location, chaotic block 920 may be marked as obsolete and may be erased.

FIG. 9E shows the non-sequential data, sectors X to X+3 and X+12 to X+15, being updated in a sequential manner in sequential block 930. Sectors X to X+3 may be written first so that block 930 is a sequential block at this point. When sector X+12 is received, a determination may be made to store the data sequentially, even though it is received non-sequentially. Sequential storage may be achieved by copying sectors X+4 to X+11 (corresponding to clusters 5 and 6) from an original block to fill the logical address range between the sectors received from the host. Sectors X+4 to X+11 may be considered padding sectors because they are used to fill or "pad out" the gap in the sectors sent by the host. Sectors X+4 to X+11 are valid sectors of data copied from another location. In this way, the received sectors are stored in sequential block 930 without going through an intermediate storage stage in a chaotic block. Thus, the main difference between these two techniques is that writing sectors X to X+3 and X+12 to X+15 to chaotic block 920 and later erasing chaotic block 920 is unnecessary in the example of FIG. 9E. Sectors X to X+3 and X+12 to X+15 are written once and sectors X+4 to X+12 are still copied in this example. This requires eight fewer sector writes and one less erase operation, thus improving the efficiency of data storage.

The determination as to whether to store non-sequentially received data sequentially or non-sequentially may be based on various criteria. Certain data is more suited to non-sequential storage, particularly data that is likely to be updated again soon. For example, control data or frequently updated portions of host data may be more efficiently stored in chaotic blocks. Certain data is more suited to sequential storage, particularly if the data is not likely to be updated again soon. While non-sequentially received data may generally be stored non-sequentially, in some cases it is advantageous to write it sequentially. Because intermediate storage in a chaotic block is avoided, there is no need to garbage collect a chaotic block to get data in a sequential format. This avoids the consolidation operation that is shown in FIG. 9D and thus reduces overhead and improves performance. When a host writes to the next free cluster it is an indication that the host is simply writing new data at the next available location and is generally not an indication that the logical address range is to be updated again soon. Therefore, selecting a sequential update scheme such as that shown in FIG. 9E may be more efficient than selecting a chaotic update scheme such as that shown in FIG. 9D. Thus, the storage scheme used may be determined according to whether the data is from the next free cluster or not. When the data is from the next free cluster as in FIG. 9E, sequential storage may be selected. Thus, the storage scheme of FIG. 9D would not be selected for this data in this example.

FIG. 10 is a flowchart showing the selection of a storage scheme according to an embodiment of the present invention. When non-sequential data is received from a host, a determination is made by the controller as to whether the data is from the next free cluster 11. This determination may be made by directly looking at FAT and directory information stored by the host in the non-volatile memory or by looking at information derived from FAT and directory information, such as information stored in a DAS or DAT. If the presently addressed cluster is not the next free cluster, then the data is stored in the normal way according to a default scheme 12.

This may mean that the data is stored non-sequentially, or in some examples there may be other criteria that would cause it to be written sequentially. If the presently addressed cluster is the next free cluster, then a sequential write is selected. In this case, valid clusters of data are copied from an original metablock to the current sequential metablock 14 to pad the logical address gap between the last written cluster and the currently addressed cluster. Then, the received data from the currently addressed cluster is written to the current sequential metablock. Thus, the current metablock 16 remains sequential.

FIG. 11 is a flowchart showing the selection of a storage scheme for a sector received from a host in one embodiment. Similar storage scheme selection flowcharts are shown in application Ser. No. 10/750,155. If there is an open update block 20, the update block is sequential 22 and the sector is sequential to the last sector in the update block 24, then the sector is written 26 to the update block. If the sector is not sequential to the last sector in the update block then a determination is made as to whether a forced sequential write should be performed 27. If the address jump from the last sector in the update block to the received sector is not greater than a predetermined amount ($C_B$) 28, then the gap between the last sector and the received sector may be padded with copied sectors 30 to maintain the update block as a sequential block as previously described. If the number of unfilled physical sectors in the update block is not greater than a predetermined amount ($C_C$) 32, then the update block may be closed 34 to maintain it as a sequential block and a new update block may be allocated 36 as previously described. The third case that causes a forced sequential write is when the host is writing to the next available cluster 40. When such a write occurs the gap between the received sector and the last sector in the update block is padded with sectors copied from elsewhere in the non-volatile memory 30 so that the update block may be maintained as a sequential block. If none of these criteria for writing data in sequential form are met, the update block may be converted to a chaotic update block 42. Thus, the selection criteria for choosing a storage scheme may include an attribute derived from data stored in the non-volatile memory by the host.

FIG. 12A shows an example of data being received non-sequentially from a host by a memory system that stores the data sequentially in update block 50. Sectors A of cluster 2 are received and subsequently sectors B of cluster 7 are received. When sectors A are received, they may be the first sectors of update block 50 and update block 50 is considered sequential if it contains only sectors A. Alternatively, as shown in FIG. 12A, update block 50 may be sequential because sectors A are stored sequentially with sectors previously stored in update block 50. Assuming update block 50 is sequential prior to receiving sectors B, a determination is made when sectors B are received as to whether to maintain update block 50 as a sequential update block or to store sectors B directly after the last sectors written to update block 50 (sectors A) and thereby convert update block 50 to a chaotic block. In this example, cluster 7 is the next free cluster following sectors A. Therefore, when sectors B from cluster 7 are received, a forced sequential write occurs and sectors are copied to update block 50 to fill the gap between sectors A and sectors B. Thus, in update block 50 of FIG. 12A the data is stored sequentially.

FIG. 12B shows an example of data being received non-sequentially from a host by a memory system that stores the data non-sequentially in update block 52. Sectors A are received first as in FIG. 12A. Sectors A are stored sequentially so that update block 52 is sequential when sectors A are programmed. Then, sectors X are received. Sectors X are not written to the next free cluster. Sectors X are written to an allocated cluster and therefore do not cause a forced sequential write to be performed. Sectors X may be written non-sequentially, or may be written sequentially if there is some other reason to do so (e.g. the logical gap between sectors X and sectors A is less than a threshold). Here, sectors X are shown being written to the next available space in update block 52. Thus, update block 52 becomes chaotic. In a second example in FIG. 12C, sectors Y are received after sectors A. Update block 54 is sequential before sectors Y are received. Sectors Y are not from the next free cluster because there is a free cluster (cluster 7) between the last written sector in the update block (sectors A) and sectors Y. Therefore, sectors Y do not cause a forced sequential write and they may be written to the update block 54 without padding, causing update block 54 to become chaotic. In a third example shown in FIG. 12D, sectors Z are received after sectors A. Update block 56 is sequential prior to receipt of sectors Z. Sectors Z are from cluster 0 and thus they are not from the next free cluster because cluster 0 is before cluster 2 and therefore, given the order shown, cluster 0 is not the next free cluster. Thus, sectors Z may be written immediately after clusters A thereby causing the update block 56 to become chaotic.

The advantages of the invention are numerous. Different embodiments or implementations may yield one or more of the following advantages. It should be noted that this is not an exhaustive list and there may be other advantages, which are not described herein. One advantage of the invention is that performance of nonvolatile memory system can be improved. Another advantage of the invention is that it can be implemented using widely used conventions. Yet another advantage of the invention is that it can be implemented as a relatively small attribute table in flash-memory. In other implementations, no table is necessary. Still another advantage is that the invention can be implemented for discretionary use and/or for use during background maintenance operations.

The various aspects or features of the invention described above can be used alone or in various combinations. The invention can also be implemented by hardware or a combination of hardware and software. The invention can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The many features and advantages of the invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

The invention claimed is:

1. A method for storing non-sequential data received from a host in a memory system, the host having a logical address space, the host further storing a File Allocation Table (FAT) or directory, and the memory system having a controller and a non-volatile memory array, the controller having another logical address space and the non-volatile memory array having a physical address space, the method comprising:

the controller obtaining information specifying a plurality of allocated clusters in the logical address space of the host and a plurality of free clusters in the logical address space of the host for storing data at the host and that have been deallocated by the host, wherein the information is obtained from the FAT or directory stored by the host, and wherein the obtained information specifies a sequence of clusters in the logical address space of the host, the clusters in the sequence indicated as free clusters or allocated clusters in the logical address space of the host;

the controller receiving a first set of non-sequential data having an address range from the host, the address range associated with the sequence of clusters in the logical address space of the host included in the obtained information;

the controller determining, based on the obtained information from the FAT or directory that the address range of the non-sequential data is not being written by the host into a first available free cluster that is positioned after a sequence of one or more allocated clusters in the sequence of clusters in the logical address space of the host, which are positioned after the last cluster from the allocated clusters into which data was last stored by the host; and in response to the determination that the non-sequential data is not being written by the host into the first available free cluster in the logical address space of the host, the controller storing the non-sequential data in a chaotic update block formed from conversion of an open sequential update block.

2. The method of claim 1, further comprising:

the controller receiving a second set of non-sequential data having a second address range from the host;

determining, based on the obtained information from the FAT or directory, that the second address range of the second set of non-sequential data is being written by the host into a next free cluster from the free clusters that is positioned after one or more allocated clusters, which are positioned after a last cluster from the allocated clusters into which data was last stored data by the host; and in response to determining that the second address range of the second set of non-sequential data is the sequentially next free cluster for storing the second set of non-sequential data, storing the second set of non-sequential data in an open sequential update block.

3. The method of claim 2, further comprising:

the controller padding the open sequential update block with original data so as to maintain the logical address ranges of the data in the open sequential update block in a sequential order.

4. The method of claim 1, further comprising:

copying the non-sequential data from a first location in the non-volatile memory array.

5. The method of claim 1, wherein the information is obtained from a Data Attribute Store that is generated from data stored in the File Allocation Table or directory, the Data Attribute Store containing a subset of information that is stored in the File Allocation Table.

6. A method of storing non-sequential data received from a host in a non-volatile memory array, the host having a logical address space, and the non-volatile memory array having a physical address space, comprising:

receiving one or more addressable units of non-sequential data from the host;

analyzing information stored by the host in the non-volatile memory array to identify a plurality of logical address ranges in the logical address space of the host available to the host for storage of data at the host, wherein information stored by the host specifies a sequence of addresses in the logical address space of the host, the addresses in the sequence indicated as free addresses or allocated addresses in the logical address space of the host;

comparing the plurality of logical address ranges available to the host with logical addresses of the received one or more addressable units of the non-sequential data to determine that the received one or more addressable units of the non-sequential data are not to be allocated to the first available free range of logical addresses that is positioned after a sequence of one or more allocated ranges of logical addresses in the sequence of addresses in the logical address space of the host, which are positioned after a last range into which data was last stored; and in response to determining that the received one or more addressable units of the non-sequential data are not to be allocated to the first available free range of logical addresses that is positioned after the sequence of one or more allocated ranges of logical addresses in the sequence of addresses in the logical address space of the host, which are positioned after a last range into which data was last stored, storing the received one or more addressable units of the non-sequential data in a chaotic update block formed from conversion of an open sequential update block.

7. The method of claim 6, further comprising:

receiving one or more addressable units of second non-sequential data from the host;

comparing the plurality of logical address ranges available to the host with logical addresses of the received one or more addressable units of the second non-sequential data to determine that the received one or more addressable units of the second non-sequential data are to be allocated to the next free range of logical addresses that is positioned after one or more allocated ranges of logical addresses, which are positioned after a last range into which data was last stored; and in response to determining that the received one or more addressable units of the second non-sequential data are to be allocated to the next free range of logical addresses that is positioned after one or more allocated ranges of logical addresses, which are positioned after a last range into which data was last stored, storing the received one or more addressable units of the second non-sequential data in an open sequential update block in a sequential manner, and the sequential manner includes leaving no unallocated logical address space between data written by an immediately prior write command and the logical addresses of the received one or more addressable units of the second non-sequential data, the sequential manner of storing including padding data to maintain sequential order.

8. The method of claim 7, wherein the storing the received one or more addressable units of second or first non-sequential data in a sequential update block or a chaotic update block, respectively, is further dependent on one or more additional factors including whether a logical address gap between the logical addresses of the received one or more addressable units of the second or first non-sequential data and the logical address of the last written addressable unit of data exceeds a predetermined amount.

9. The method of claim 8, wherein the one or more additional factors include whether an update block for storing the one or more addressable units of data contains more than a predetermined amount of data in a sequential form.

10. A memory device for storing non-sequential data in non-volatile memory, the data being received by a controller from a host in addressable units of data, the host having a logical address space, the host further storing a File Allocation Table (FAT), the controller having another logical address space, and the non-volatile memory having a physical address space, comprising:
a non-volatile memory array for storing data; and
a memory controller in communication with the non-volatile memory array, the memory controller being configured for logical-to-physical address mapping to map logical addresses provided by the host for storage of data at the host to physical addresses in the memory array, the memory controller configured for:
monitoring allocation states of logical addresses of the host based on information specifying a sequence of addresses indicated as free addresses or allocated addresses in the logical address space of the host from the host's FAT to determine whether the monitored allocation states indicate that an addressable unit of non-sequential data is being stored in the first available free range of logical addresses of the host that is positioned after a sequence of one or more allocated ranges of logical addresses in the sequence of addresses in the logical address space of the host, which are positioned after a last allocated range into which data was last stored, or being stored in another free range of logical addresses that is positioned after the first available free range; and
selecting a physical address for storing the addressable unit of non-sequential data in either a forced sequential manner or a chaotic manner in response to determining whether the monitored allocation states indicate that the addressable unit of non-sequential data is being stored in the first available free range of logical addresses that is positioned after one or more allocated ranges of logical addresses in the logical address space of the host, which are positioned after a last allocated range into which data was last stored, or being stored in another free range of logical addresses that is positioned after the first available free range.

11. The memory device of claim 10, wherein the memory device forms part of a removable memory card that is removably connected to a controller.

12. The memory device of claim 10, wherein the memory controller is further configured for recording the allocation states of logical addresses of the host in a Data Attribute Store that is stored in the non-volatile memory array separately from the host's File Allocation Table.

13. The memory device of claim 10, wherein the addressable unit of non-sequential data is received from a host for storing in the non-volatile memory array, the memory controller being configured to select a physical address for storing the addressable unit of non-sequential data in a forced sequential manner if the monitored allocation states indicate that the addressable unit of non-sequential data is the next free range.

14. The memory device of claim 10, wherein the addressable unit of non-sequential data is received from a host for storing in the non-volatile memory array, the memory controller being configured to select a physical address for storing the addressable unit of non-sequential data in a chaotic manner if the monitored allocation states indicate that the addressable unit of non-sequential data is not the next free range.

15. A non-transitory computer readable medium including program code for storing non-sequential data received from a host in a memory system, the host having a logical address space, the host further storing a File Allocation Table (FAT) or directory, and the memory system having a controller and a non-volatile memory array, the controller having another logical address space and the non-volatile memory array having a physical address space, the program code being configured for:
obtaining information specifying a plurality of allocated clusters in the logical address space of the host and a plurality of free clusters for storing data at the host and that have been deallocated by the host, wherein the information is from the FAT or directory stored by the host, and wherein the obtained information specifies a sequence of clusters in the logical address space of the host, the clusters in the sequence indicated as free clusters or allocated clusters in the logical address space of the host;
receiving a first set of non-sequential data having an address range from the host, the address range associated with the sequence of clusters in the logical address space of the host included in the obtained information;
determining, based on the obtained information from the FAT or directory that the address range of the non-sequential data is not being written by the host into a first available free cluster that is positioned after a sequence of one or more allocated clusters in the sequence of clusters in the logical address space of the host, which are positioned after the last cluster from the allocated clusters into which data was last stored data by the host; and
in response to the determination that the non-sequential data is not being written by the host into the first available free cluster in the logical address space of the host, storing the non-sequential data in a chaotic update block formed from conversion of an open sequential update block.

16. The non-transitory computer readable medium of claim 15, the program code being further configured for:
receiving a second set of non-sequential data having a second address range from the host;
determining, based on the obtained information from the FAT or directory, that the second address range of the second set of non-sequential data is being written by the host into a next free cluster from the free clusters that is positioned after one or more allocated clusters, which are positioned after a last cluster from the allocated clusters into which data was last stored data by the host; and
in response to determining that the second address range of the second set of non-sequential data is the sequentially next free cluster for storing the non-sequential data, storing the second set of non-sequential data in an open sequential update block.

17. The non-transitory computer readable medium of claim 16, the program code being further configured for:
padding the open sequential update block with original data so as to maintain the logical address ranges of the data in the open sequential update block in a sequential order.

18. The non-transitory computer readable medium of claim 15, the program code being further configured for:

copying the non-sequential data from a first location in the non-volatile memory array.

19. The non-transitory computer readable medium of claim 15, wherein the information is obtained from a Data Attribute Store that is generated from data stored in the File Allocation Table or directory, the Data Attribute Store containing a subset of information that is stored in the File Allocation Table.

\* \* \* \* \*